US012625646B2

(12) United States Patent
Kim et al.

(10) Patent No.: US 12,625,646 B2
(45) Date of Patent: May 12, 2026

(54) STORAGE DEVICE, STORAGE CONTROLLER, AND OPERATING METHOD FOR REORDERING READ REQUESTS

(71) Applicant: SAMSUNG ELECTRONICS CO., LTD., Suwon-si (KR)

(72) Inventors: Sundong Kim, Suwon-si (KR); Eunkyung Park, Suwon-si (KR); Syungki Lee, Suwon-si (KR); Juhun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/806,112

(22) Filed: Aug. 15, 2024

(65) Prior Publication Data

US 2025/0224900 A1     Jul. 10, 2025

(30) Foreign Application Priority Data

Jan. 10, 2024     (KR) ........................ 10-2024-0004351

(51) Int. Cl.
*G06F 3/06*          (2006.01)
(52) U.S. Cl.
CPC .......... *G06F 3/0656* (2013.01); *G06F 3/0613* (2013.01); *G06F 3/0688* (2013.01)
(58) Field of Classification Search
CPC ..... G06F 3/0656; G06F 3/0613; G06F 3/0688

USPC ......................................................... 711/154
See application file for complete search history.

(56) References Cited

U.S. PATENT DOCUMENTS

| | | | |
|---|---|---|---|
| 8,473,646 B1 | 6/2013 | Certain et al. | |
| 9,135,192 B2 * | 9/2015 | Lin ..................... | G06F 13/1626 |
| 9,652,156 B2 | 5/2017 | Alcantara et al. | |
| 9,846,650 B2 | 12/2017 | Chang et al. | |
| 11,233,874 B2 | 1/2022 | Rozas | |
| 2016/0162186 A1 * | 6/2016 | Kashyap ............... | G06F 3/0688 711/103 |
| 2016/0253095 A1 * | 9/2016 | Alcantara ............. | G06F 3/0679 711/103 |
| 2018/0150220 A1 | 5/2018 | Pandian et al. | |

* cited by examiner

*Primary Examiner* — Than Nguyen
(74) *Attorney, Agent, or Firm* — Fish & Richardson P.C.

(57) ABSTRACT

A storage device includes a storage controller controlling a plurality of read operations in response to a plurality of read requests sequentially received from a host, a plurality of nonvolatile memories connected to the storage controller through a plurality of channels and performing the plurality of read operations in parallel, and a buffer memory connected to the plurality of nonvolatile memories. Each read operation includes an internal transmission period for transmitting read data from a nonvolatile memory to the buffer memory and an external transmission period for transmitting the read data from the buffer memory to the host. The storage controller reorders an output sequence of a plurality of pieces of read data and sequentially transmits the plurality of pieces of read data to the host according to the reordered output sequence.

19 Claims, 20 Drawing Sheets

| CASE | READ LATENCY FOR EACH STATE OF NVM |
|---|---|
| NVM: IDLE STATE | READ |
| NVM: READ IN PROCESS | READ READ |
| NVM: PROGRAM IN PROCESS | PROGRAM READ |
| NVM: ERASE IN PROCESS | ERASE READ |

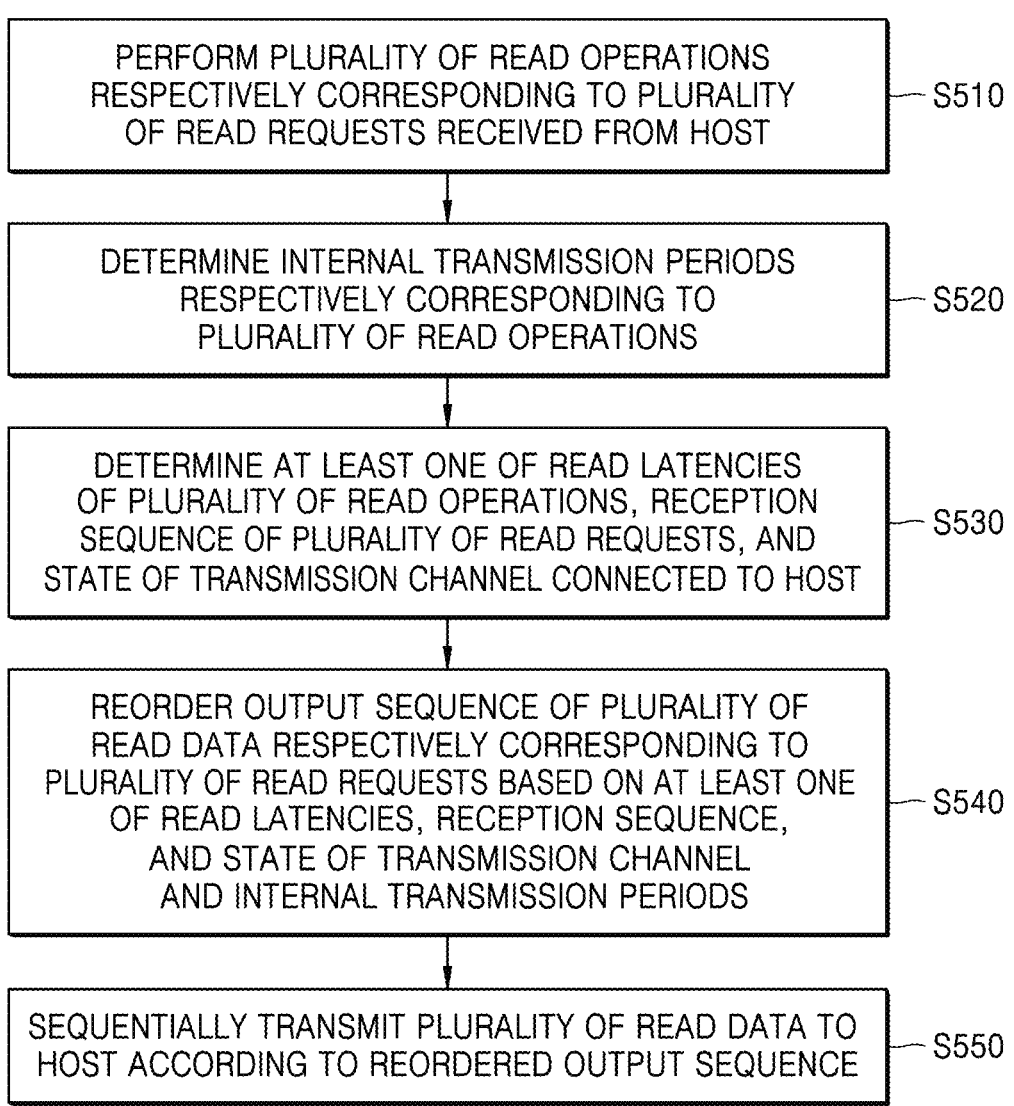

PERFORM PLURALITY OF READ OPERATIONS RESPECTIVELY CORRESPONDING TO PLURALITY OF READ REQUESTS RECEIVED FROM HOST — S510

DETERMINE INTERNAL TRANSMISSION PERIODS RESPECTIVELY CORRESPONDING TO PLURALITY OF READ OPERATIONS — S520

DETERMINE AT LEAST ONE OF READ LATENCIES OF PLURALITY OF READ OPERATIONS, RECEPTION SEQUENCE OF PLURALITY OF READ REQUESTS, AND STATE OF TRANSMISSION CHANNEL CONNECTED TO HOST — S530

REORDER OUTPUT SEQUENCE OF PLURALITY OF READ DATA RESPECTIVELY CORRESPONDING TO PLURALITY OF READ REQUESTS BASED ON AT LEAST ONE OF READ LATENCIES, RECEPTION SEQUENCE, AND STATE OF TRANSMISSION CHANNEL AND INTERNAL TRANSMISSION PERIODS — S540

SEQUENTIALLY TRANSMIT PLURALITY OF READ DATA TO HOST ACCORDING TO REORDERED OUTPUT SEQUENCE — S550

STORAGE DEVICE, STORAGE CONTROLLER, AND OPERATING METHOD FOR REORDERING READ REQUESTS

CROSS-REFERENCE TO RELATED APPLICATION

This application claims priority to Korean Patent Application No. 10-2024-0004351, filed in the Korean Intellectual Property Office on Jan. 10, 2024, the disclosure of which is incorporated by reference herein in its entirety.

BACKGROUND

A storage device may include a storage controller and a nonvolatile memory device, and the nonvolatile memory device may include a plurality of nonvolatile memories. In this case, when the storage controller is connected to the plurality of nonvolatile memories through a plurality of channels, memory operations on the plurality of nonvolatile memories may be performed in parallel. As the number of nonvolatile memories included in the storage device increases and the performance of the nonvolatile memories improves, the performance of the storage device may improve. In this case, an order reversal phenomenon in which a memory operation corresponding to a request received later from a host is performed earlier than a memory operation corresponding to a request received earlier from the host, for example, out-of-order, may occur, thus affecting latency.

SUMMARY

In general, in some aspects, the present disclosure is directed toward a storage device, a storage controller, and an operating method of the storage controller that may improve a read latency.

According to some implementation, the present disclosure is directed to a storage device including a storage controller configured to control, in response to a plurality of read requests sequentially received from a host, a plurality of read operations respectively corresponding to the plurality of read requests, a plurality of nonvolatile memories connected to the storage controller through a plurality of channels and configured to perform the plurality of read operations in parallel, and a buffer memory connected to the plurality of nonvolatile memories, wherein each read operation of the plurality of read operations includes a respective internal transmission period for transmitting read data from the plurality of nonvolatile memories to the buffer memory and a respective external transmission period for transmitting the read data from the buffer memory to the host, and the storage controller is configured to reorder, based on the internal transmission periods of the plurality of read operations, an output sequence of a plurality of pieces of read data respectively corresponding to the plurality of read requests, and sequentially transmit the plurality of pieces of read data to the host according to the reordered output sequence.

According to some implementations, the present disclosure is directed to a storage controller for controlling a plurality of nonvolatile memories, the storage controller including a host interface configured to sequentially receive a plurality of read requests from a host, a response reordering module configured to reorder, based on execution times of a plurality of read operations executed in the plurality of nonvolatile memories in response respectively to the plurality of read requests, an output sequence of a plurality of pieces of read data respectively corresponding to the plurality of read requests such that read data corresponding to a read operation with an execution time longer than a reference time is first output, and a nonvolatile memory interface configured to transmit a plurality of read commands respectively corresponding to the plurality of read requests to the plurality of nonvolatile memories in parallel through a plurality of channels, wherein the host interface is configured to sequentially transmit the plurality of pieces of read data to the host according to the reordered output sequence.

According to some implementations, the present disclosure is directed to an operating method of a storage controller, the operating method including sequentially receiving a plurality of read requests from a host, transmitting a plurality of read commands respectively corresponding to the plurality of read requests to a plurality of nonvolatile memories, transmitting a plurality of pieces of read data from the plurality of nonvolatile memories to a buffer memory, reordering, based on execution times of a plurality of read operations executed in the plurality of nonvolatile memories in response respectively to the plurality of read requests, an output sequence of the plurality of pieces of read data such that read data corresponding to a read operation with an execution time longer than a reference time is first output, and sequentially transmitting the plurality of pieces of read data to the host according to the reordered output sequence.

BRIEF DESCRIPTION OF THE DRAWINGS

Example implementations will be more clearly understood from the following detailed description, taken in conjunction with the accompanying drawings.

FIG. 2 is a block diagram illustrating an example of a storage device according to some implementations.

FIG. 4 is a block diagram illustrating an example of a storage controller according to some implementations.

FIG. 12 illustrates examples of read latency for each state of a nonvolatile memory according to some implementations.

FIG. 16 is a block diagram illustrating an example of a storage controller according to some implementations.

FIG. 19 is a flowchart illustrating an example of an operating method of a storage device according to some implementations.

DETAILED DESCRIPTION

Figure 1:
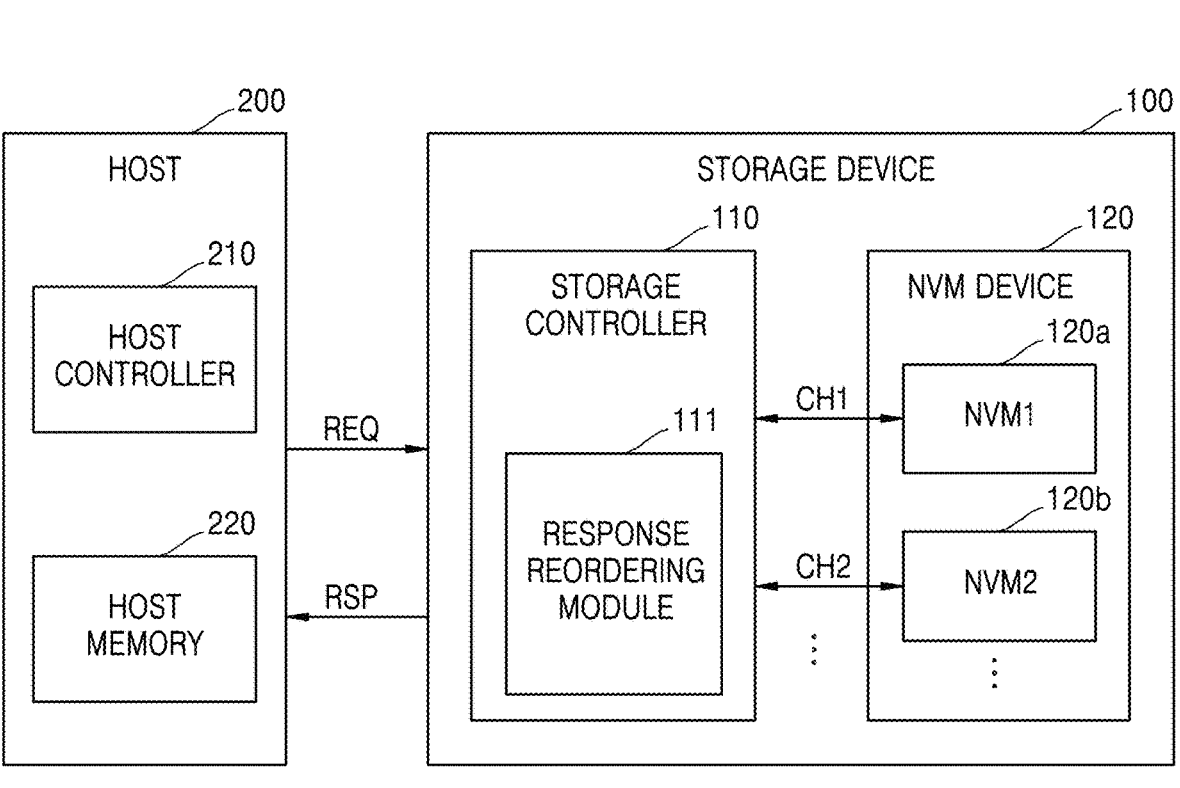
FIG. 1 is a block diagram illustrating an example of a storage system according to some implementations.

Hereinafter, example implementations will be explained in detail with reference to the accompanying drawings. Herein, like reference numerals will denote like elements, and redundant descriptions thereof will be omitted for conciseness.

FIG. 1 is a block diagram illustrating an example of a storage system according to some implementations. In FIG. 1, a storage system 10 may include a storage device 100 and a host 200 and may be referred to as a host-storage system. The storage device 100 may include a storage controller 110 and a nonvolatile memory device 120. According to some implementations, the storage controller 110 may be referred to as a controller, a memory controller, or a nonvolatile memory controller. According to some implementations, the nonvolatile memory device 120 may include a plurality of nonvolatile memories such as a plurality of memory chips, a plurality of memory dies, or a plurality of memory planes. This will be described in more detail with reference to FIG. 2.

The host 200 may include a host controller 210 and a host memory 220. The host controller 210 may manage an operation of storing data of a buffer area of the host memory 220 in the nonvolatile memory device 120 or storing data of the nonvolatile memory device 120 in a buffer area of the host memory 220. The host memory 220 may function as a buffer memory for temporarily storing write data to be transmitted to the storage device 100 or read data received from the storage device 100.

For example, the host controller 210 may be any one of a plurality of modules provided in an application processor, and the application processor may be implemented as a system-on-chip (SoC). Also, the host memory 220 may be an embedded memory provided in the application processor or may be a nonvolatile memory or a memory module arranged outside the application processor.

The storage controller 110 may receive a request REQ from the host 200, control a memory operation on the nonvolatile memory device 120 in response to the request REQ, and provide a response RSP according to the memory operation to the host 200. For example, the memory operation may include a read operation, a program operation, or an erase operation. In an embodiment, the storage controller 110 may sequentially receive a plurality of requests from the host 200 and sequentially transmit a plurality of responses respectively corresponding to the plurality of requests to the host 200.

The storage controller 110 may be connected to a plurality of nonvolatile memories including first and second nonvolatile memories 120a and 120b through a plurality of channels including first and second channels CH1 and CH2. For example, the storage controller 110 may be connected to the first nonvolatile memory 120a through the first channel CH1 and to the second nonvolatile memory 120b through the second channel CH2. In this case, the plurality of nonvolatile memories including the first and second nonvolatile memories 120a and 120b may perform memory operations in parallel.

Because the nonvolatile memory device 120 includes a plurality of nonvolatile memories and the plurality of nonvolatile memories may perform memory operations in parallel, the response speed to the request REQ received from the host 200 may be very high. Also, as the capacity and performance of each of the plurality of nonvolatile memories improves, the performance of the storage device 100 may be higher than the performance of the host 200. For example, the storage device 100 may rapidly generate a plurality of responses respectively corresponding to a plurality of requests received from the host 200, and the speed at which the storage device 100 generates a plurality of responses may be higher than the speed of receiving a plurality of responses in the host 200. In this case, some of the plurality of responses generated by the storage device 100 may be accumulated in the storage device 100. Accordingly, despite the performance improvement of the storage device 100, the overall performance of the storage system 10 may not be significantly improved.

However, according to some implementations, the storage device 100 may sequentially receive a plurality of read requests from the host 200, may reorder the output sequence of a plurality of responses based on read latencies respectively corresponding to the plurality of read requests, and may sequentially transmit the plurality of responses to the host 200 according to the reordered output sequence. Particularly, the storage device 100 may transmit read data corresponding to a request with a read latency greater than a reference value to the host 200 earlier than other read data.

For example, the storage device 100 may prioritize read data corresponding to a request with a relatively longer read latency or to a request with a relatively longer execution time of a read operation and may reorder the output sequence of a plurality of pieces of read data such that the prioritized read data is transmitted to the host 200 earlier than other read data. Accordingly, even when the performance of the host 200 is lower than the performance of the storage device 100, the overall read latency of the plurality of pieces of read data may be improved.

Particularly, the storage controller 110 may control a plurality of read operations respectively corresponding to a plurality of read requests. In this case, each of the plurality of read operations may include an internal transmission period for transmitting read data from the nonvolatile memory device 120 including a plurality of nonvolatile memories to a buffer memory (e.g., 112 of FIG. 4) of the storage controller 110 and an external transmission period for transmitting the read data from the buffer memory to the host 200.

In some implementations, the storage controller 110 may include a response reordering module 111. According to some implementations, the response reordering module 111 may be referred to as an arbitrator. The response reordering module 111 may reorder the output sequence of the plurality of pieces of read data respectively corresponding to the plurality of read requests based on the internal transmission periods respectively corresponding to the plurality of read operations. In an embodiment, the response reordering module 111 may reorder the output sequence of the plurality of pieces of read data such that read data corresponding to a read operation with the longest internal transmission period among the plurality of read operations is output earlier than other read data.

In some implementations, in a corresponding nonvolatile memory among the plurality of nonvolatile memories, the internal transmission period may include a first period for transmitting read data from a memory cell array to a page buffer circuit and a second period for transmitting read data from the page buffer circuit to the buffer memory. The response reordering module 111 may reorder the output sequence of the plurality of pieces of read data such that read data corresponding to a read operation, in which the first period is longer than or equal to a first reference time, the second period is longer than or equal to a second reference time, or the entire internal transmission period is longer than or equal to the entire reference time, is output earlier than other read data.

In some implementations, the external transmission period may include a pending period in which the read data is pending in the buffer memory. The response reordering module 111 may reorder the output sequence of the plurality of pieces of read data such that the pending period of read data corresponding to a read operation with the longest internal transmission period among the plurality of read operations is shorter than the pending periods of other read data. For example, the response reordering module 111 may arrange read data with a relatively shorter pending period before a response queue or a data queue.

According to some implementations, by reordering the output sequence of a plurality of pieces of read data based on the internal transmission periods of a plurality of read operations, the storage device 100 may transmit read data with a relatively longer read latency to the host 200 earlier than other read data. Accordingly, a response speed delay of read data in which an order reversal phenomenon has occurred in the nonvolatile memory device 120 may be reduced, and thus, an overall read latency of the storage device 100 may be improved. Also, according to embodiments, by reordering the output sequence of a plurality of pieces of read data or outputting a plurality of pieces of read data based on the state of a transmission channel connected to the host 200, transmission resources may be efficiently used to improve the throughput of the storage device 100.

The storage device 100 may include storage mediums for storing data according to the request from the host 200. As an example, the storage device 100 may include at least one of a solid state drive (SSD), an embedded memory, and a removable external memory. When the storage device 100 is an SSD, the storage device 100 may be a device conforming to the nonvolatile memory express (NVMe) standard. When the storage device 100 is an embedded memory or an external memory, the storage device 100 may be a device conforming to the universal flash storage (UFS) or embedded multimedia card (eMMC) standard. The host 200 and the storage device 100 may each generate a packet according to an adopted standard protocol and transmit the same.

Figure 2:
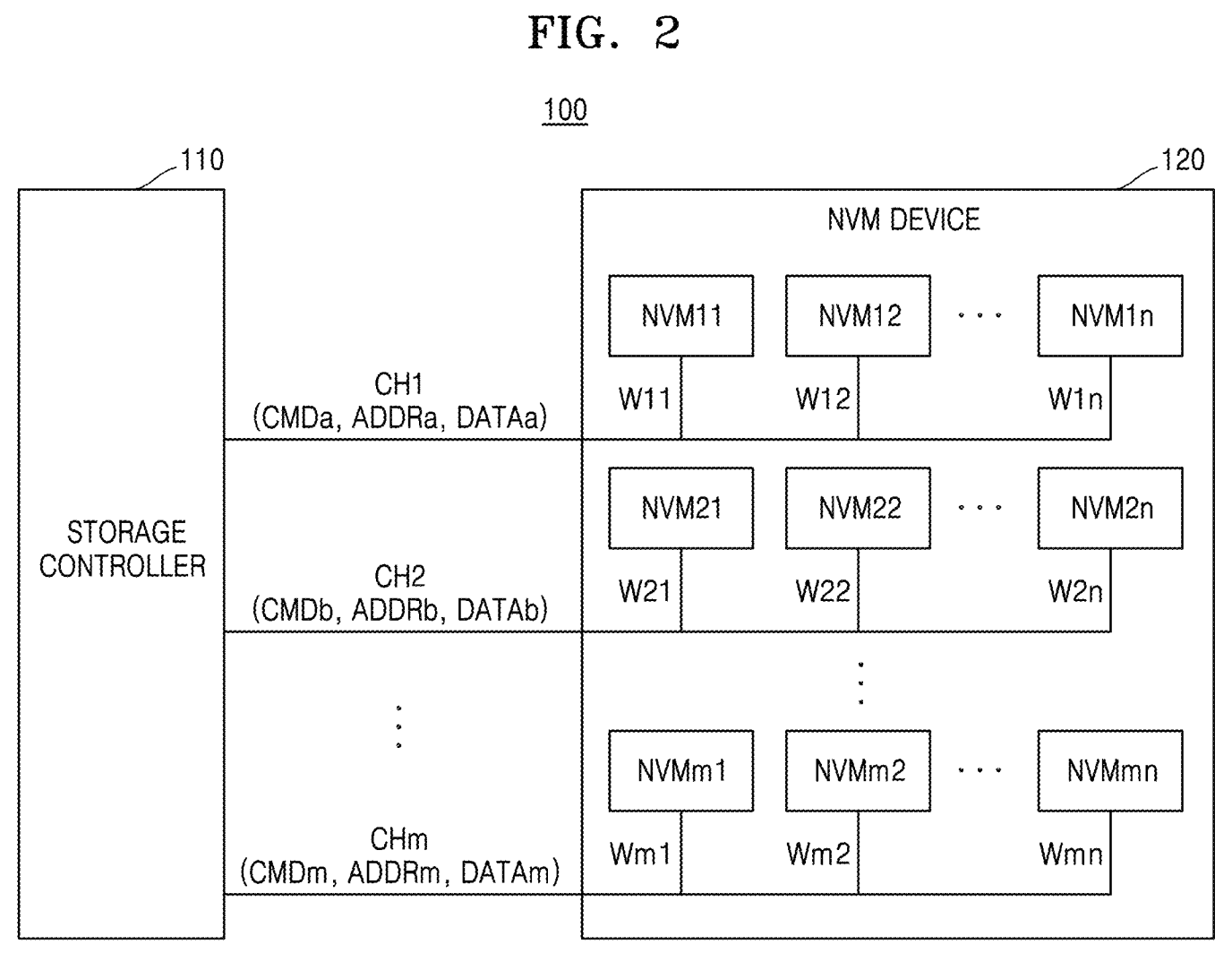

FIG. 2 is a block diagram illustrating an example of a storage device according to some implementations. In FIG. 2, a storage device 100 may support a plurality of channels CH1 to CHm, and a nonvolatile memory device 120 and a storage controller 110 may be connected through the plurality of channels CH1 to CHm. The nonvolatile memory device 120 may include a plurality of nonvolatile memories NVM11 to NVMmn. Each of the plurality of nonvolatile memories NVM11 to NVMmn may be connected to one of the plurality of channels CH1 to CHm through a corresponding way.

For example, nonvolatile memories NVM11 to NVM1$n$ may be connected to a first channel CH1 through ways W11 to W1$n$ and nonvolatile memories NVM21 to NVM2$n$ may be connected to a second channel CH2 through ways W21 to W2$n$. In some implementations, each of the nonvolatile memories NVM11 to NVMmn may be implemented as a certain memory unit that may operate according to a separate command from the storage controller 110. For example, each of the nonvolatile memories NVM11 to NVMmn may be implemented as a chip or die; however, the inventive concept is not limited thereto.

The storage controller 110 may transmit/receive signals to/from the nonvolatile memory device 120 through the plurality of channels CH1 to CHm. For example, the storage controller 110 may transmit commands CMDa to CMDm, addresses ADDRa to ADDRm, and data DATAa to DATAm to the nonvolatile memory device 120 through the channels CH1 to CHm or receive data DATAa to DATAm from the nonvolatile memory device 120.

The storage controller 110 may select one of the nonvolatile memories NVM11 to NVMmn connected to the corresponding channel through each channel and transmit/receive signals to/from the selected nonvolatile memory. For example, the storage controller 110 may select the nonvolatile memory NVM11 from among the nonvolatile memories NVM11 to NVM1$n$ connected to the first channel CH1. The storage controller 110 may transmit the command CMDa, the address ADDRa, and the data DATAa to the selected nonvolatile memory NVM11 through the first channel CH1 or receive the data DATAa from the selected nonvolatile memory NVM11.

The storage controller 110 may transmit/receive signals to/from the nonvolatile memory device 120 in parallel through different channels. For example, the storage controller 110 may transmit the command CMDb to the nonvolatile memory device 120 through the second channel CH2 while transmitting the command CMDa to the nonvolatile memory device 120 through the first channel CH1. For example, the storage controller 110 may receive the data DATAb from the nonvolatile memory device 120 through the second channel CH2 while receiving the data DATAa from the nonvolatile memory device 120 through the first channel CH1.

The storage controller 110 may control the overall operation of the nonvolatile memory device 120. The storage controller 110 may control each of the nonvolatile memories NVM11 to NVMmn connected to the channels CH1 to CHm by transmitting signals through the channels CH1 to CHm. For example, the storage controller 110 may control a selected one of the nonvolatile memories NVM11 to NVM1$n$ by transmitting the command CMDa and the address ADDRa through the first channel CH1.

Each of the nonvolatile memories NVM11 to NVMmn may operate under the control by the storage controller 110. For example, the nonvolatile memory NVM11 may program the data DATAa according to the command CMDa and the address ADDRa received through the first channel CH1. For example, the nonvolatile memory NVM21 may read the data DATAb according to the command CMDb and the address ADDRb received through the second channel CH2 and transmit the read data DATAb to the storage controller 110.

FIG. 2 illustrates that the nonvolatile memory device 120 communicates with the storage controller 110 through m channels and the nonvolatile memory device 120 includes n nonvolatile memories corresponding to each channel; however, the number of channels and the number of nonvolatile memories connected to one channel may vary according to esome implementations.

Figure 3:
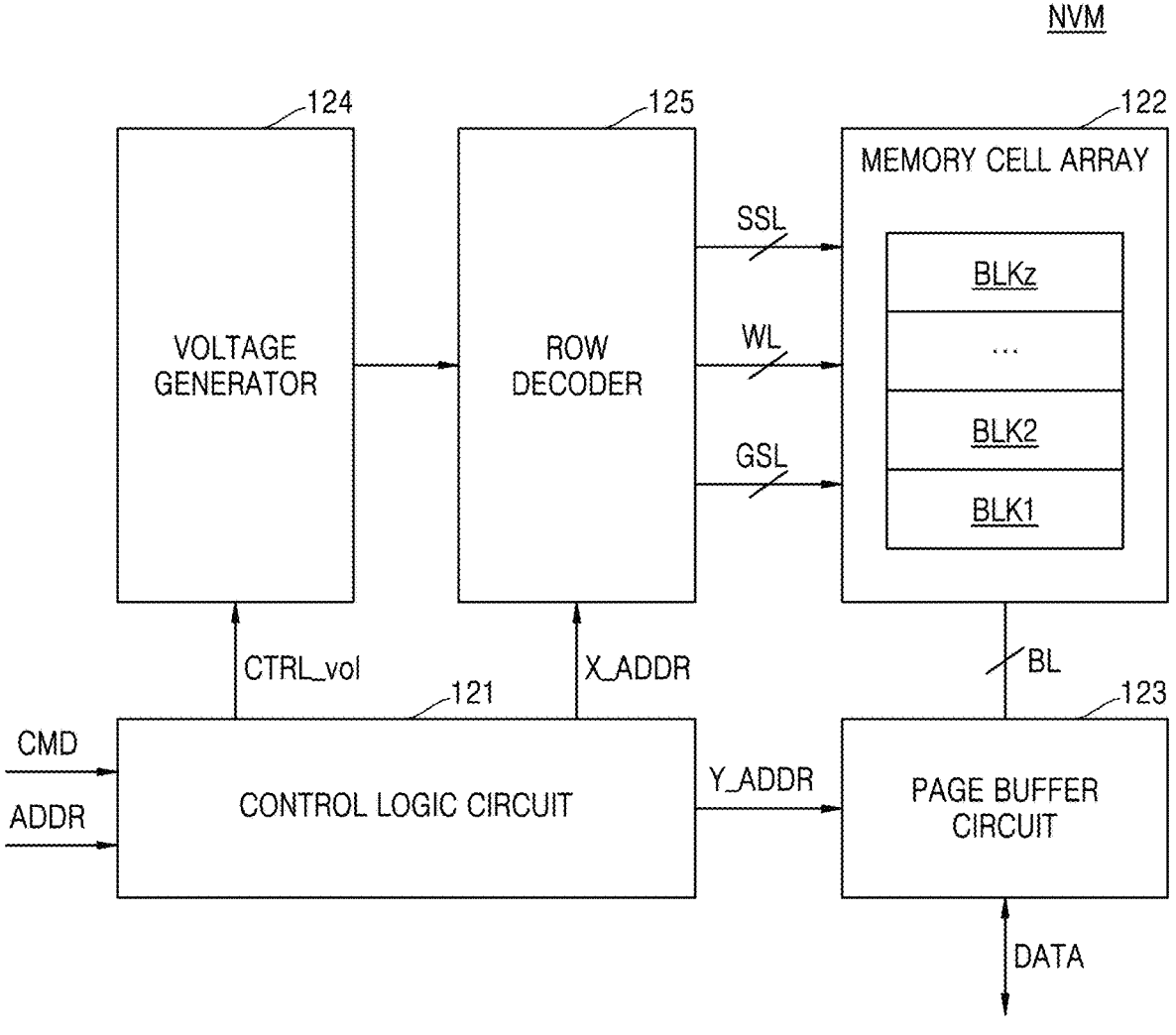
FIG. 3 is a block diagram illustrating an example of a nonvolatile memory according to some implementations.

FIG. 3 is a block diagram illustrating an example of a nonvolatile memory NVM according to some implementations. In FIG. 3, the nonvolatile memory NVM may include a control logic circuit 121, a memory cell array 122, a page buffer circuit 123, a voltage generator 124, and a row decoder 125. The nonvolatile memory NVM may correspond to one of the first and second nonvolatile memories 120a and 120b of FIG. 1 or the nonvolatile memories NVM11 to NVMmn of FIG. 2.

The memory cell array 122 may include a plurality of memory blocks BLK1 to BLKz, each of the memory blocks BLK1 to BLKz may include a plurality of cell strings, and the plurality of cell strings may include a plurality of memory cells connected in series. The memory cell array 122 may be connected to the page buffer circuit 123 through bit lines BL and may be connected to the row decoder 125 through word lines WL, string selection lines SSL, and ground selection lines GSL.

In some implementations, the memory cell array 122 may include a three-dimensional (3D) memory cell array, and the 3D memory cell array may include a plurality of cell strings. Each cell string may include memory cells respectively connected to word lines vertically stacked over a substrate. U.S. Pat. Nos. 7,679,133, 8,553,466, 8,654,587, 8,559,235, and U.S. Patent Application Publication No. 2011/0233648 are incorporated herein in their entirety by reference.

In some implementations, the memory cell array 122 may include a flash memory, and the flash memory may include a two-dimensional (2D) NAND memory array or a 3D (vertical) NAND (VNAND) memory array. In some implementations, the memory cell array 122 may include magnetic RAMS (MRAMs), spin-transfer torque MRAMs, conductive bridging RAMs (CBRAMs), ferroelectric RAMs (FRAMs), phase-change RAMs (PRAMs), resistive memories (resistive RAMs), and various other types of memories.

The control logic circuit 121 may overall control various operations in the nonvolatile memory NVM. The control logic circuit 121 may output various control signals in response to a command CMD and/or an address ADDR. For example, the control logic circuit 121 may output a voltage control signal CTRL_vol, a row address X_ADDR, and a column address Y_ADDR. The voltage generator 124 may generate various types of voltages for performing program, read, and erase operations based on the voltage control signal CTRL_vol. The row decoder 125 may select one of a plurality of word lines WL and one of a plurality of string selection lines SSL in response to the row address X_ADDR. The page buffer circuit 123 may select at least one bit line from among the bit lines BL in response to the column address Y_ADDR. The page buffer circuit 123 may operate as a write driver or as a sense amplifier according to an operation mode.

According to some implementations, the control logic circuit 121 may control a read operation according to the command CMD received from the storage controller 110, for example, a read command. The read operation may include a first period for transmitting read data from the memory cell array 122 to the page buffer circuit 123 and a second period for transmitting read data from the page buffer circuit 123 to a buffer memory (e.g., 112 of FIG. 4). The length of the first period and/or the second period may vary depending on the operation states of the nonvolatile memory NVM. Particularly, when the nonvolatile memory NVM is processing a previous memory operation, the length of the first period and/or the second period may increase. Also, the length of the first period and/or the second period may vary depending on the types of the previous memory operation being processed in the nonvolatile memory NVM.

For example, when the nonvolatile memory NVM is in an idle state, the nonvolatile memory NVM may immediately perform a read operation in response to a read command, and in this case, the read latency may be relatively short. Moreover, for example, the nonvolatile memory NVM may not immediately perform a read operation in response to a read command when the nonvolatile memory NVM is performing a previous memory operation and may perform a read operation when the previous memory operation is completed. Accordingly, in this case, the read latency may be relatively long.

Figure 4:
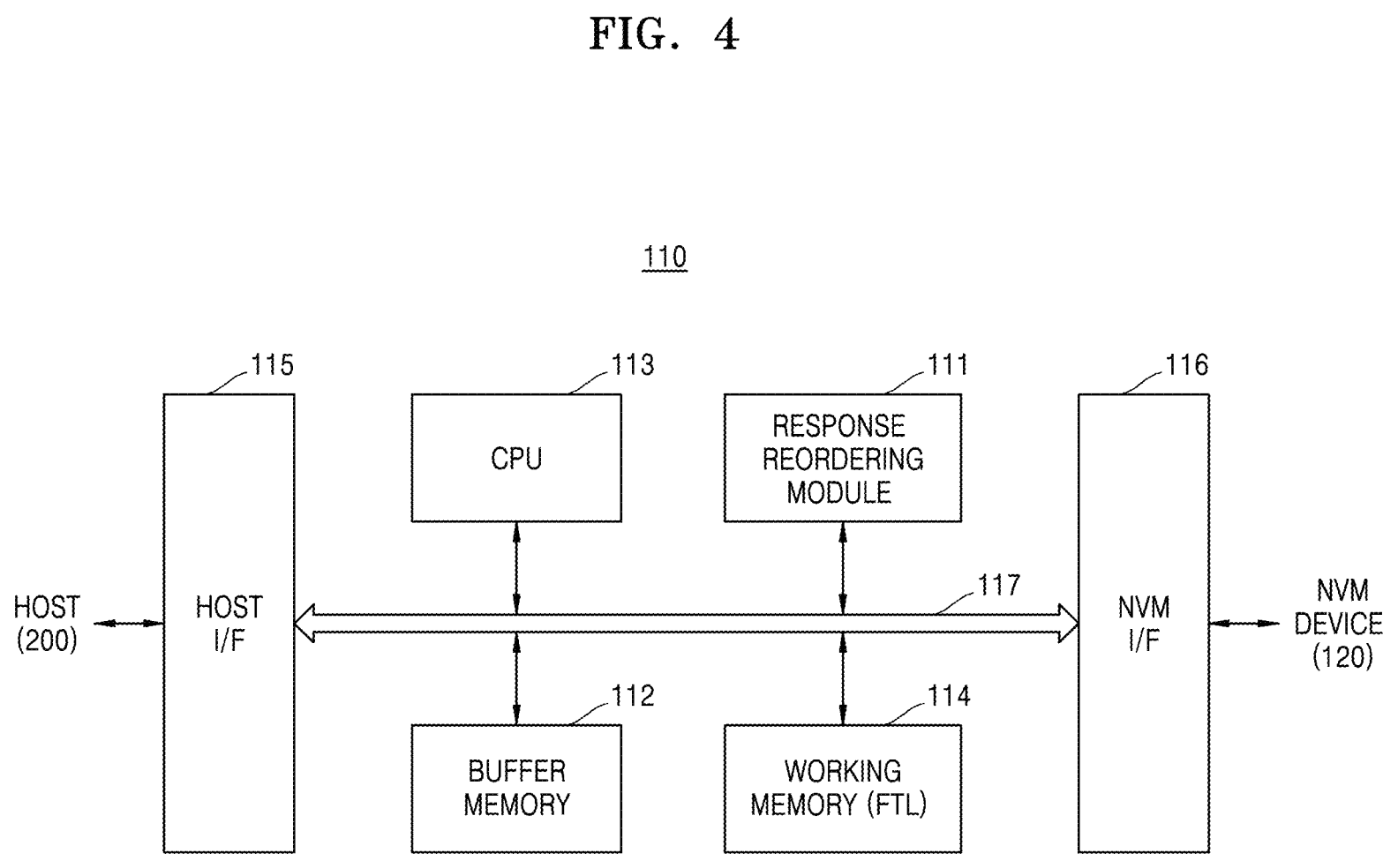

FIG. 4 is a block diagram illustrating an example of a storage controller according to some implementations. In FIG. 4, a storage controller 110 may include a response reordering module 111, a buffer memory 112, a central processing unit (CPU) 113, a working memory 114, a host interface (I/F) 115, and a nonvolatile memory interface 116, which may communicate with each other through a bus 117. A flash translation layer (FTL) may be loaded into the working memory 114, and data program and read operations on the nonvolatile memory device 120 may be controlled by executing the FTL by the CPU 113.

The host interface 115 may transmit/receive packets to/from the host 200. The packet transmitted from the host 200 to the host interface 115 may include, for example, a command or write data to be written in the nonvolatile memory device 120, and the packet transmitted from the host interface 115 to the host 200 may include, for example, a response to a command or read data received from the nonvolatile memory device 120.

In some implementations, the host interface 115 may sequentially receive a plurality of requests from the host 200 and sequentially transmit a plurality of responses or a plurality of pieces of read data to the host 200. For example, the host interface 115 may sequentially receive a plurality of read requests from the host 200 and sequentially transmit a plurality of pieces of read data to the host 200 in response to the plurality of read requests.

In some implementations, the host 200 and the storage device 100 may communicate with each other based on a predetermined interface. The predetermined interface may support at least one of various interfaces such as Universal Serial Bus (USB), Small Computer System Interface (SCSI), PCI express, ATA, Parallel ATA (PATA), Serial ATA (SATA), Serial Attached SCSI (SAS), UFS, NVMe, and Compute Express Link (CXL); however, the present disclosure is not limited thereto.

Based on the execution times of a plurality of read operations executed in a plurality of nonvolatile memories in response respectively to a plurality of read requests, the response reordering module 111 may reorder the output sequence of a plurality of pieces of read data respectively corresponding to the plurality of read requests. For example, the response reordering module 111 may be implemented by using hardware. However, the inventive concept is not limited thereto, and the response reordering module 111 may be implemented by using software and/or firmware. Particular operations of the response reordering module 111 are described below in more detail with reference to FIGS. 5 to 7 and FIGS. 10 to 13.

The buffer memory 112 may temporarily store write data to be written in the nonvolatile memory device 120 or read data to be read from the nonvolatile memory device 120. The buffer memory 112 may be provided in the storage controller 110 or may be arranged outside the storage controller 110. For example, the storage controller 110 may further include a buffer memory manager or a buffer memory interface for communicating with the buffer memory 112.

The nonvolatile memory interface 116 may transmit write data to be written in the nonvolatile memory device 120 to the nonvolatile memory device 120 or receive read data read from the nonvolatile memory device 120. The nonvolatile memory interface 116 may be implemented to comply with a standard protocol such as Toggle or Open NAND Flash Interface (ONFI).

Figure 5:
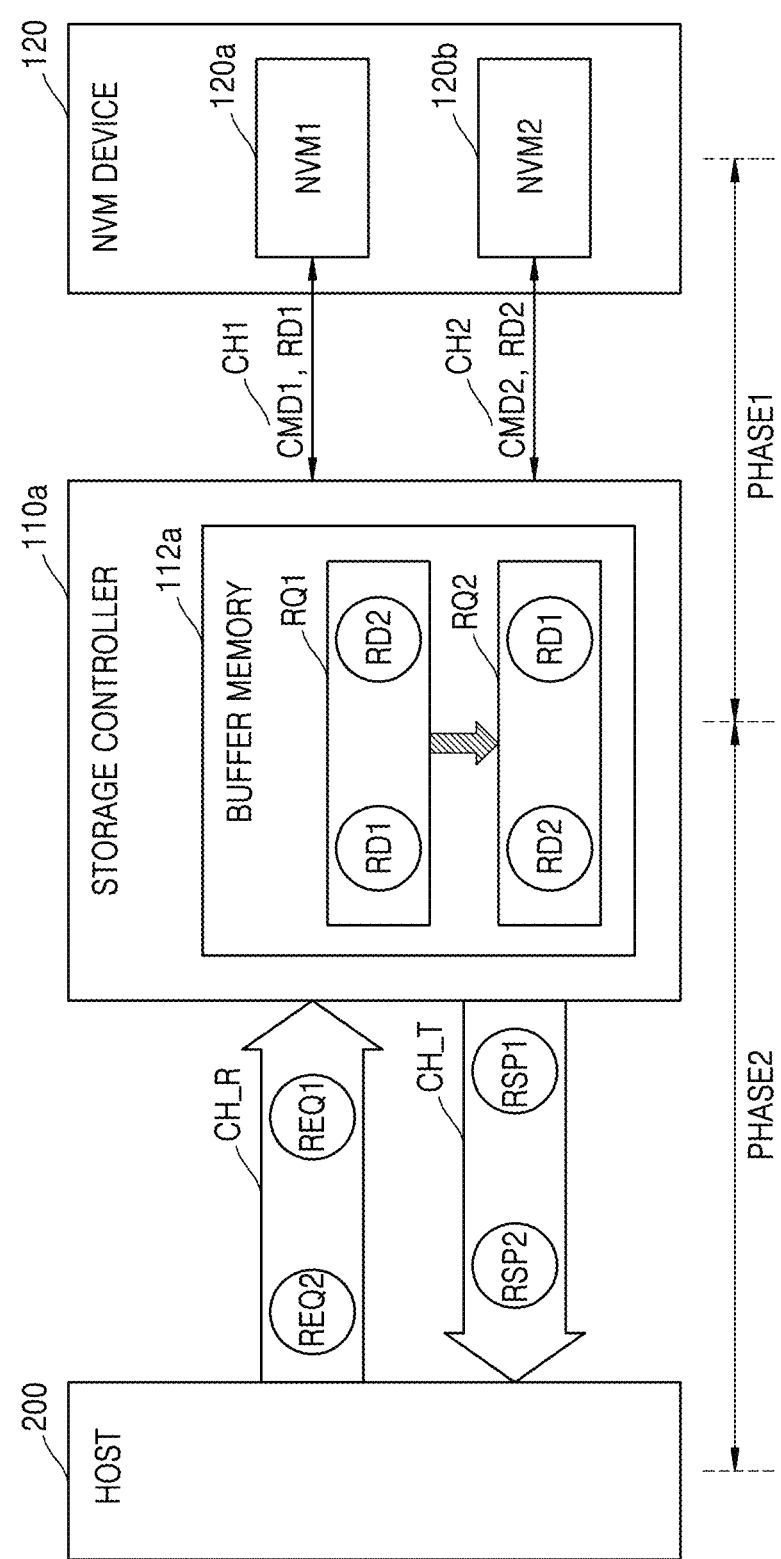
FIG. 5 is a block diagram illustrating an example of an operation of a storage system according to some implementations.

FIG. 5 is a block diagram illustrating an example of an operation of a storage system according to some implementations. In FIG. 5, a storage system 10a may correspond to an implementation example of the storage system 10 of FIG. 1, and the descriptions given above with reference to FIGS. 1 to 4 may also be applied to some implementations.

In FIG. 5, a storage controller 110a may sequentially receive a first read request REQ1 and a second read request REQ2 from a host 200. For example, the storage controller 110a may sequentially receive the first and second read requests REQ1 and REQ2 from the host 200 through a reception channel CH_R. Particularly, the storage controller 110a may first receive the first read request REQ1 from the host 200 and then receive the second read request REQ2 from the host 200. According to embodiments, the reception channel CH_R may be understood as including Host Direct Memory Access (HDMA). According to some implementations, the reception channel CH_R may be understood as being included in a host interface (e.g., 115 of FIG. 4).

The storage controller 110a may control a first read operation in response to the first read request REQ1 and control a second read operation in response to the second read request REQ2. The storage controller 110a may generate a first read command CMD1 in response to the first read request REQ1 and transmit the generated first read command CMD1 to a nonvolatile memory device 120. Also, the storage controller 110a may generate a second read command CMD2 in response to the second read request REQ2 and transmit the generated second read command CMD2 to the nonvolatile memory device 120.

For example, the first read command CMD1 may be transmitted to a first nonvolatile memory 120a through a first channel CH1 and the second read command CMD2 may be transmitted to a second nonvolatile memory 120b through a second channel CH2. However, the present disclosure is not limited thereto, and according to some implementations, the first read command CMD1 may be transmitted to the second nonvolatile memory 120b through the second channel CH2 and the second read command CMD2 may be transmitted to the first nonvolatile memory 120a through the first channel CH1. In this case, the first and second read commands CMD1 and CMD2 may be transmitted in parallel to the nonvolatile memory device 120. In some implementations, the transmission start time of the first read command CMD1 may be earlier than the transmission start time of the second read command CMD2. However, the present disclosure is not limited thereto, and transmission start times of the first and second read commands CMD1 and CMD2 may vary according to embodiments.

The first nonvolatile memory 120a may perform a first read operation in response to the first read command CMD1 and transmit first read data RD1 to the storage controller 110a through the first channel CH1 as a result of performing the first read operation. The second nonvolatile memory 120b may perform a second read operation in response to the second read command CMD2 and transmit second read data RD2 to the storage controller 110a through the second channel CH2 as a result of performing the second read operation. In this case, the first and second read data RD1 and RD2 may be transmitted in parallel to the storage controller 110a. The execution times of the first and second read operations may vary depending on the operation states of the first and second nonvolatile memories 120a and 120b. Hereinafter, the execution times of the first and second read operations are described with reference to FIG. 6.

Figure 6:
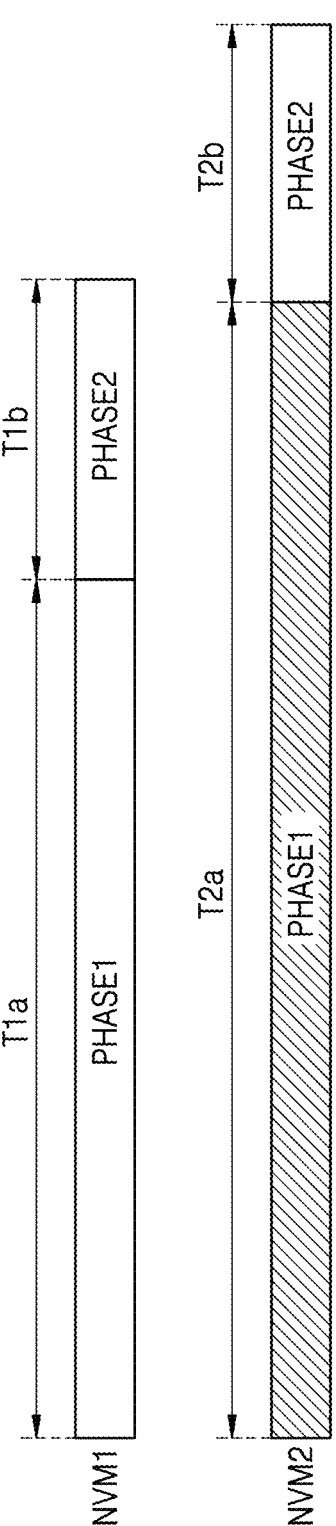
FIG. 6 illustrates an example of a read latency according to some implementations.

FIG. 6 illustrates an example of a read latency according to some implementations. In FIGS. 5 and 6, a read operation corresponding to each read request may include an internal transmission period PHASE1 for transmitting read data from the nonvolatile memory device 120 to a buffer memory 112a and an external transmission period PHASE2 for transmitting the read data or a response including the read data from the buffer memory 112a to the host 200. The storage controller 110a may reorder the output sequence of the read data such that read data corresponding to a read operation with a relatively great length of the internal transmission period PHASE1 may be first transmitted to the host 200. For example, the storage controller 110a may reorder the output sequence of the read data such that read data corresponding to a read operation with a greater length of the internal transmission period PHASE1 than a reference value may be first transmitted to the host 200.

For example, a first read operation corresponding to the first read request REQ1 may include a first internal transmission period T1a for transmitting the first read data RD1 from the first nonvolatile memory 120a to the buffer memory 112a and a first external transmission period T1b for transmitting the first read data RD1 from the buffer memory 112a to the host 200. For example, a second read operation corresponding to the second read request REQ2 may include a second internal transmission period T2a for transmitting the second read data RD2 from the second nonvolatile memory 120b to the buffer memory 112a and a second external transmission period T2b for transmitting the second read data RD2 from the buffer memory 112a to the host 200.

For example, the length of the second internal transmission period T2a may be greater than the length of the first internal transmission period T1a. In other words, the read latency of the second read operation corresponding to the second read request REQ2 may be longer than the read latency of the first read operation corresponding to the first read request REQ1. For example, the buffer memory 112a may first receive the first read data RD1 and then receive the second read data RD2. In this case, the first and second read data RD1 and RD2 may be stored such that the first read data RD1 is first output and then the second read data RD2 is output, and for example, the first and second read data RD1 and RD2 may be buffered in the buffer memory 112a like a first response queue RQ1.

In some implementations, when the second internal transmission period T2a is longer than a reference time, the storage controller 110a may reorder the output sequence of the first and second read data RD1 and RD2. Particularly, the storage controller 110a may reorder the output sequence of the first and second read data RD1 and RD2 such that the second read data RD2 is first output and then the first read data RD1 is output. For example, the first and second read data RD1 and RD2 may be buffered in the buffer memory 112a like a second response queue RQ2.

The storage controller 110a may sequentially transmit the second read data RD2 and the first read data RD1 to the host 200 according to the reordered output sequence. For example, the storage controller 110a may sequentially transmit second and first responses RSP2 and RSP1 to the host 200 through a transmission channel CH_T. Particularly, the storage controller 110a may first transmit the second response RSP2 including the second read data RD2 to the host 200 and then transmit the first response RSP1 including the first read data RD1 to the host 200. According to embodiments, the transmission channel CH_T may be understood as including HDMA. According to some implementations, the transmission channel CH_T may be understood as being included in a host interface, such as the host interface 115 of FIG. 4.

Figure 7:
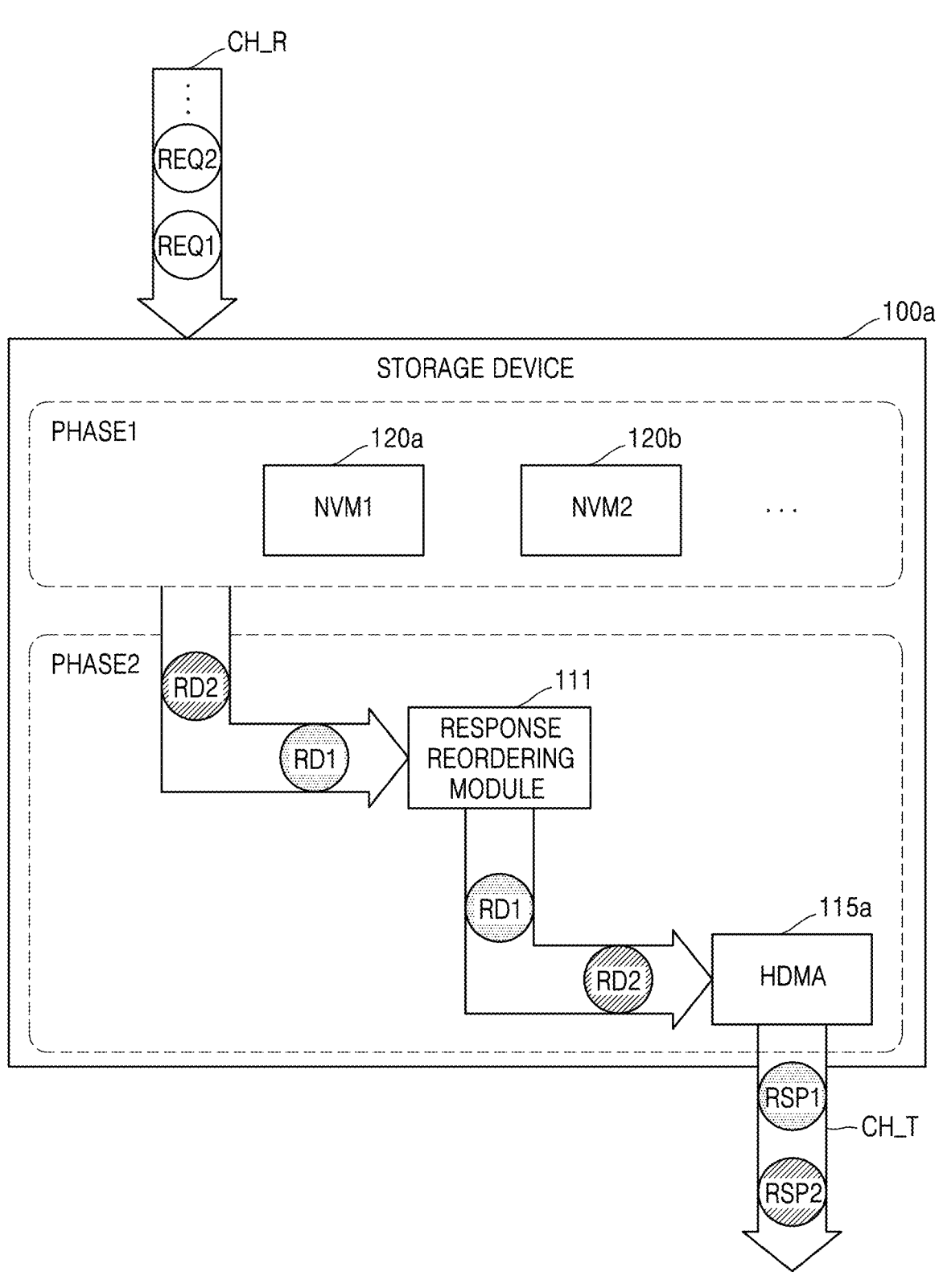
FIG. 7 is a block diagram illustrating an example of an operation of a storage device according to some implementations.

FIG. 7 is a block diagram illustrating an example of an operation of a storage device according to some implementations. In FIGS. 6 and 7, the operation of the storage device 100a represents in more detail the operation of the storage controller 110a illustrated in FIG. 5. The storage device 100a may sequentially receive the first and second read requests REQ1 and REQ2 through the reception channel CH_R. In the internal transmission period PHASE1, the first and second nonvolatile memories 120a and 120b may perform the first and second read operations respectively corresponding to the first and second read requests REQ1 and REQ2. For example, when the first nonvolatile memory 120a immediately performs the first read operation and the second nonvolatile memory 120b fails to immediately perform the second read operation due to the processing of a previous operation, the length of the second internal transmission period T2a of the second read operation may be greater than the length of the first internal transmission period T1a of the first read operation.

In the external transmission period PHASE2, in order to compensate for the read latency of the second read request REQ2 due to the length of the second internal transmission period T2a, the response reordering module 111 may reorder the output sequence of the first and second read data RD1 and RD2 such that the second read data RD2 is output before the first read data RD1. Accordingly, the storage device 100a may first output the second response RSP2 including the second read data RD2 and then output the first response RSP1 including the first read data RD1. For example, an HDMA 115a may first output the second response RSP2 and then output the first response RSP1 through the transmission channel CH_T. For example, the HDMA 115a may correspond to an example of the host interface 115.

Figure 8:
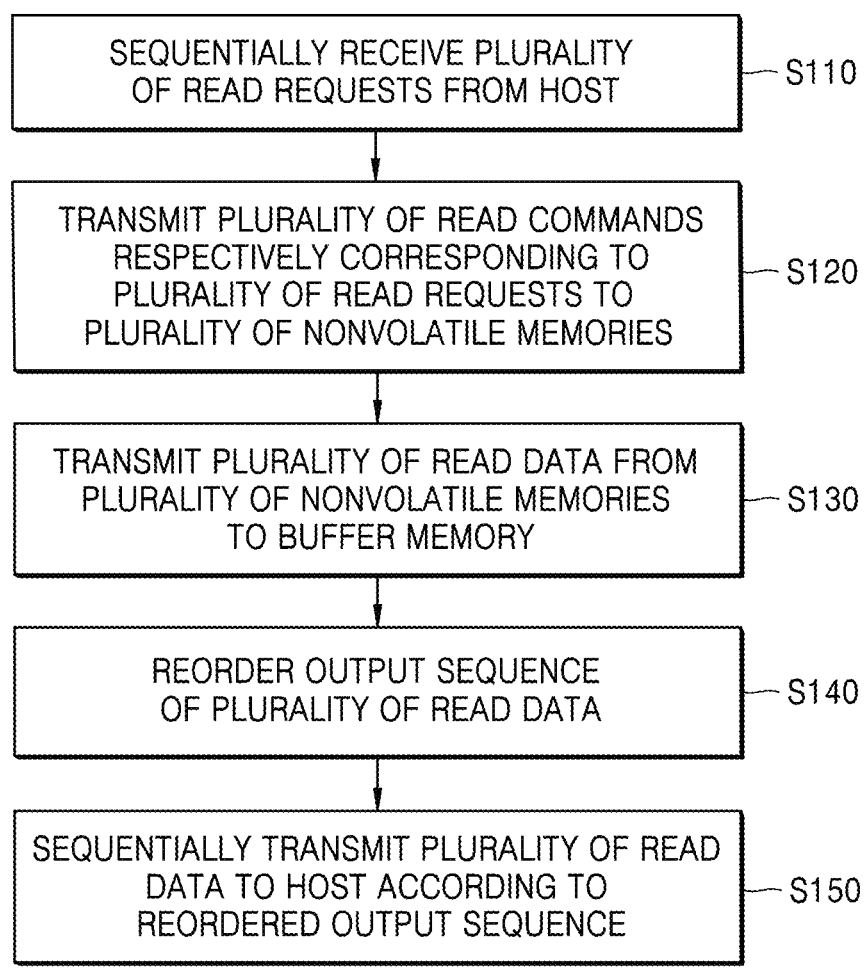
FIG. 8 is a flowchart illustrating an example of an operating method of a storage device according to some implementations.

FIG. 8 is a flowchart illustrating an example of an operating method of a storage device according to some implementations. In FIG. 8, an operating method of the storage device may include, for example, operations performed in a time series in the storage device 100 of FIG. 1. The descriptions given above with reference to FIGS. 1 to 7 may also be applied to some implementations. In operation S110, the storage device 100 may sequentially receive a plurality of read requests from the host 200. In operation S120, the storage device 100 may transmit a plurality of read commands respectively corresponding to the plurality of read requests to a plurality of nonvolatile memories. For example, the plurality of read commands may be transmitted in parallel to the plurality of nonvolatile memories.

In operation S130, the storage device 100 may transmit a plurality of pieces of read data from the plurality of non-volatile memories to the buffer memory. For example, like the first response queue (e.g., RQ1 of FIG. 5), the plurality of pieces of read data may be buffered in the buffer memory according to the sequence of being received in the buffer memory. In operation S140, the storage device 100 may reorder the output sequence of the plurality of pieces of read data. For example, the storage device 100 may reorder the output sequence of the plurality of pieces of read data such that read data corresponding to a read operation with an execution time longer than a reference time is output earlier than other read data. For example, like the second response queue (e.g., RQ2 of FIG. 5), the plurality of pieces of read data may be buffered in the buffer memory according to the reordered output sequence. In operation S150, the storage device 100 may sequentially transmit the plurality of pieces of read data to the host 200 according to the reordered output sequence.

Figure 9:
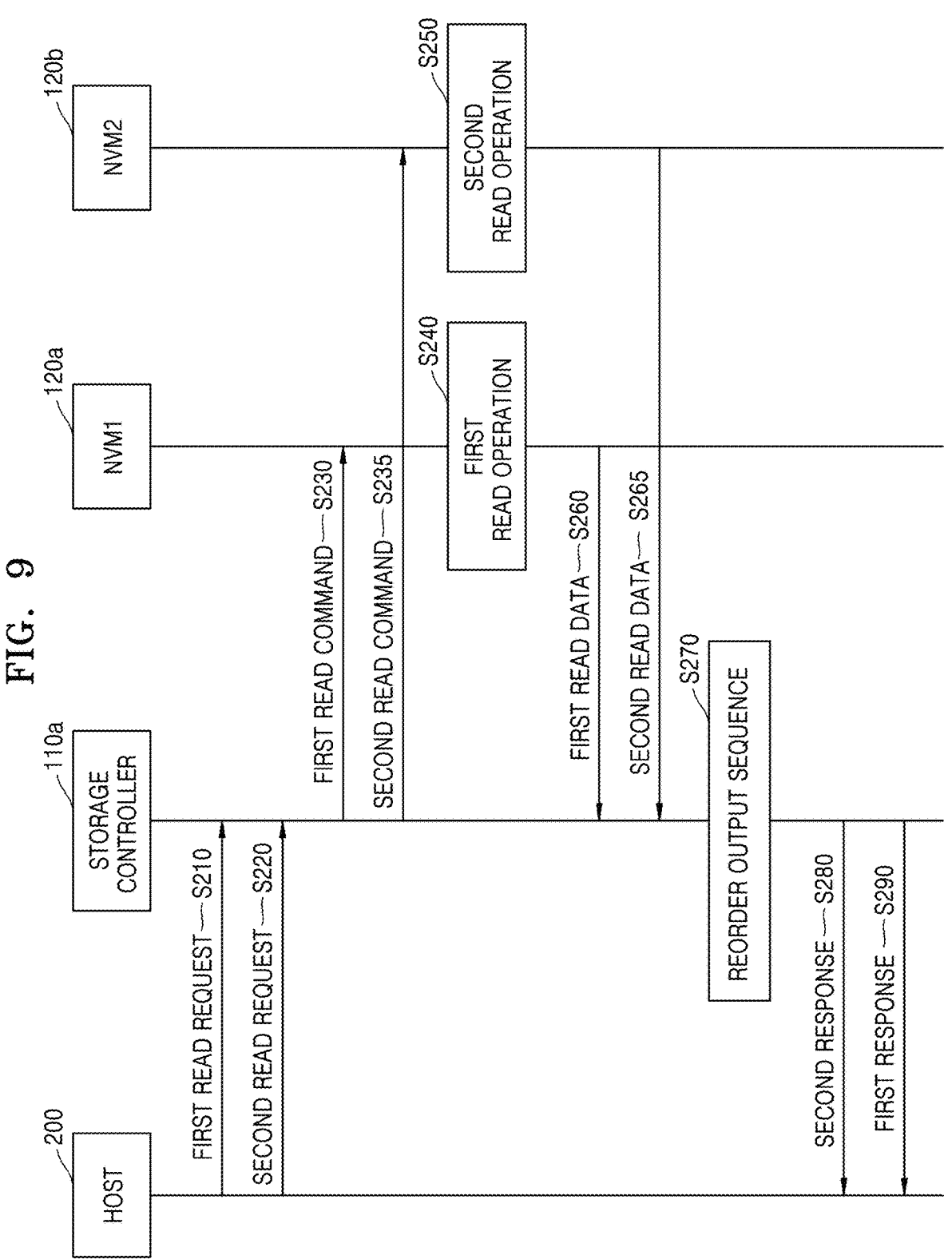
FIG. 9 is a flowchart illustrating examples of an operating method of a host, a storage controller, and first and second nonvolatile memories according to some implementations.

FIG. 9 is a flowchart illustrating examples of an operating method of a host, a storage controller, and first and second nonvolatile memories according to some implementations. In FIG. 9, an operating method may be performed, for example, by the host 200, the storage controller 110a, and the first and second nonvolatile memories 120a and 120b of FIG. 5. In operation S210, the host 200 may transmit a first read request REQ1 to the storage controller 110a. In operation S220, the host 200 may transmit a second read request REQ2 to the storage controller 110a. As such, the host 200 may sequentially transmit the first and second read requests REQ1 and REQ2 to the storage controller 110a.

In operation S230, the storage controller 110a may transmit a first read command CMD1 corresponding to the first read request REQ1 to the first nonvolatile memory 120a. In operation S235, the storage controller 110a may transmit a second read command CMD2 corresponding to the second read request REQ2 to the second nonvolatile memory 120b. For example, operations S230 and S235 may be performed in parallel. For example, operation S230 may be performed before operation S235; however, the inventive concept is not limited thereto and operation S235 may be performed before operation S230.

In operation S240, the first nonvolatile memory 120a may perform a first read operation in response to the first read command CMD1. In operation S250, the second nonvolatile memory 120b may perform a second read operation in response to the second read command CMD2. For example, operations S240 and S250 may be performed in parallel. In operation S260, the first nonvolatile memory 120a may transmit first read data RD1 to the storage controller 110a. In operation S265, the second nonvolatile memory 120b may transmit second read data RD2 to the storage controller 110a. For example, operations S260 and S265 may be performed in parallel.

In operation S270, the storage controller 110a may reorder the output sequence of the first and second read data RD1 and RD2. For example, the storage controller 110a may reorder the output sequence such that the second read data RD2 is output before the first read data RD1. In an embodiment, the storage controller 110a may reorder the output sequence of the first and second read data RD1 and RD2 based on the execution times of the first and second read operations. In an embodiment, the storage controller 110a may reorder the output sequence of the first and second read data RD1 and RD2 based on the first internal transmission period (e.g., T1a of FIG. 6) of the first read operation and the second internal transmission period (e.g., T2a of FIG. 6) of the second read operation. In an embodiment, the storage controller 110a may determine a second pending time during which the second read data RD2 is pending in the buffer memory to be shorter than a first pending time during which the first read data RD1 is pending in the buffer memory.

In operation S280, the storage controller 110a may transmit a second response RSP2 including the second read data RD2 to the host 200. In operation S290, the storage controller 110a may transmit a first response RSP1 including the first read data RD1 to the host 200. As such, the storage controller 110a may sequentially transmit the second and first responses RSP2 and RSP1 to the host 200. Accordingly, even when the execution time of the second read operation corresponding to the second read request REQ2 takes a long time, the read latency of the second read operation may be reduced by preferentially outputting the second read data.

Figure 10:
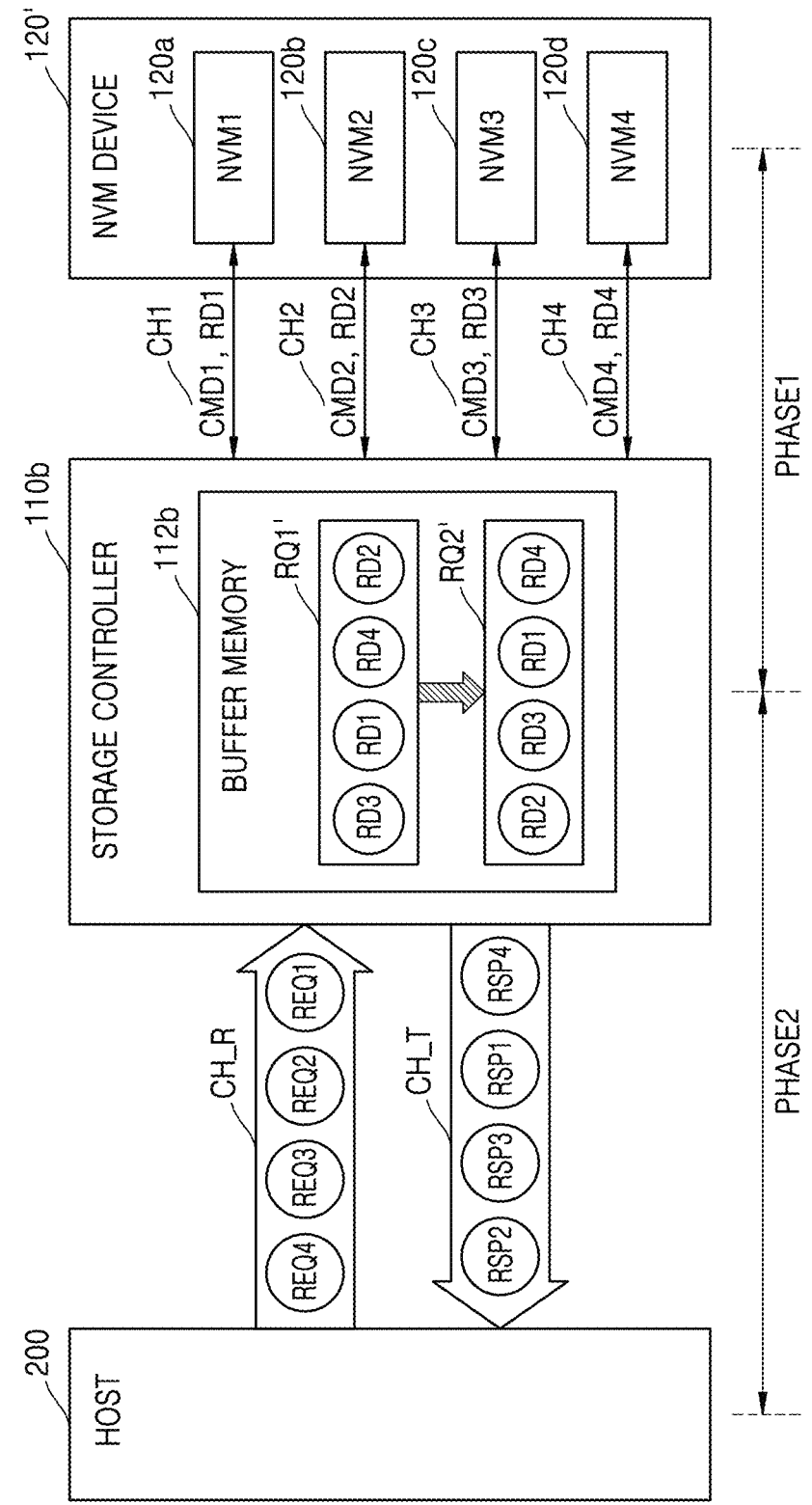
FIG. 10 is a block diagram illustrating an example of an operation of a storage system according to some implementations.

FIG. 10 is a block diagram illustrating an example of an operation of a storage system according to some implementations. In FIG. 10, a storage system 10b may correspond to an implementation example of the storage system 10 of FIG. 1, and the descriptions given above with reference to FIGS. 1 to 4 may also be applied to the present embodiment. The storage system 10b may correspond to a modification example of the storage system 10a of FIG. 5, and the descriptions given above with reference to FIGS. 5 to 9 may also be applied in some implementations.

In FIG. 10, a storage controller 110b may sequentially receive first to fourth read requests REQ1 to REQ4 from a host 200. For example, the storage controller 110b may sequentially receive the first to fourth read requests REQ1 to REQ4 from the host 200 through a reception channel CH_R. Particularly, the storage controller 110b may first receive the first read request REQ1 from the host 200, then receive the second read request REQ2 from the host 200, then receive the third read request REQ3 from the host 200, and then receive the fourth read request REQ4 from the host 200.

The storage controller 110b may control first to fourth read operations in response to the first to fourth read requests REQ1 to REQ4 respectively. Particularly, the storage controller 110b may generate first to fourth read commands CMD1 to CMD4 in response to the first to fourth read requests REQ1 to REQ4 and transmit the generated first to fourth read commands CMD1 to CMD4 to a nonvolatile memory device 120'. For example, the first read command CMD1 may be transmitted to a first nonvolatile memory 120a through a first channel CH1, the second read command CMD2 may be transmitted to a second nonvolatile memory 120b through a second channel CH2, the third read command CMD3 may be transmitted to a third nonvolatile memory 120c through a third channel CH3, and the fourth read command CMD4 may be transmitted to a fourth nonvolatile memory 120d through a fourth channel CH4. In this case, the first to fourth read commands CMD1 to CMD4 may be transmitted in parallel to the nonvolatile memory device 120'.

The first nonvolatile memory 120a may perform a first read operation in response to the first read command CMD1 and transmit first read data RD1 to the storage controller 110b through the first channel CH1 as a result of performing the first read operation. The second nonvolatile memory 120b may perform a second read operation in response to the second read command CMD2 and transmit second read data RD2 to the storage controller 110b through the second channel CH2 as a result of performing the second read operation. The third nonvolatile memory 120c may perform a third read operation in response to the third read command CMD3 and transmit third read data RD3 to the storage controller 110b through the third channel CH3 as a result of performing the third read operation. The fourth nonvolatile memory 120d may perform a fourth read operation in response to the fourth read command CMD4 and transmit fourth read data RD4 to the storage controller 110b through the fourth channel CH4 as a result of performing the fourth read operation. In this case, the first to fourth read data RD1 to RD4 may be transmitted in parallel to the storage controller 110b.

Figure 11:
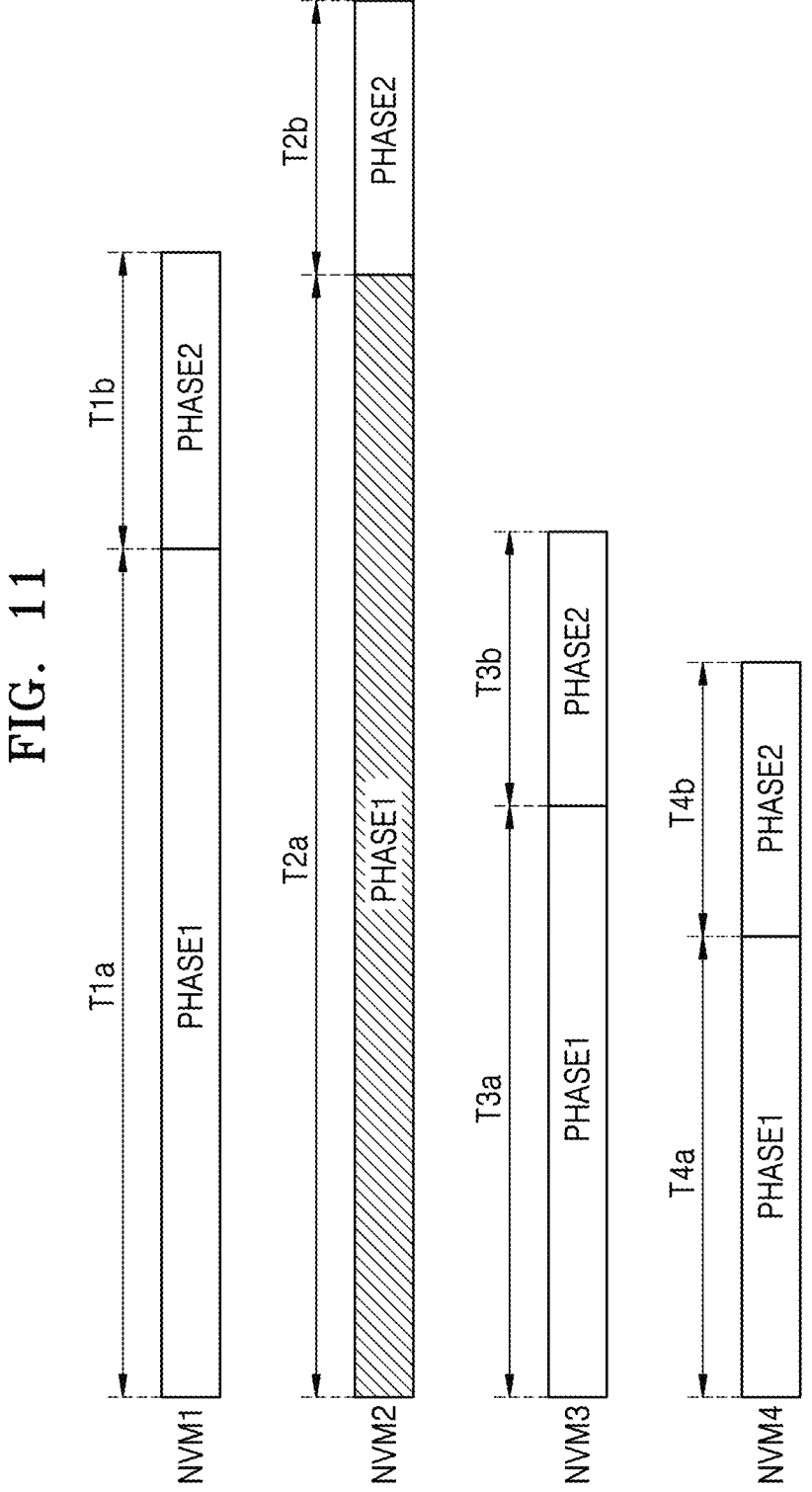
FIG. 11 illustrates an example of a read latency according to some implementations.

FIG. 11 illustrates an example of a read latency according to some implementations. In FIGS. 10 and 11, a read operation corresponding to each read request may include an internal transmission period PHASE1 for transmitting read data from the nonvolatile memory device 120' to a buffer memory 112b and an external transmission period PHASE2 for transmitting the read data or a response including the read data from the buffer memory 112b to the host 200. The storage controller 110b may reorder the output sequence of the read data such that read data corresponding to a read operation with a relatively great length of the internal transmission period PHASE1 may be first transmitted to the host 200. For example, the storage controller 110b may reorder the output sequence of the read data such that read data corresponding to a read operation with a greater length of the internal transmission period PHASE than a reference value may be first transmitted to the host 200.

For example, a first read operation corresponding to the first read request REQ1 may include a first internal transmission period T1a for transmitting the first read data RD1 from the first nonvolatile memory 120a to the buffer memory 112b and a first external transmission period T1b for transmitting the first read data RD1 from the buffer memory 112b to the host 200. For example, a second read operation corresponding to the second read request REQ2 may include a second internal transmission period T2a for transmitting the second read data RD2 from the second nonvolatile memory 120b to the buffer memory 112b and a second external transmission period T2b for transmitting the second read data RD2 from the buffer memory 112b to the host 200. For example, a third read operation corresponding to the third read request REQ3 may include a third internal transmission period T3a for transmitting the third read data RD3 from the third nonvolatile memory 120c to the buffer memory 112b and a third external transmission period T3b for transmitting the third read data RD3 from the buffer memory 112b to the host 200. For example, a fourth read operation corresponding to the fourth read request REQ4 may include a fourth internal transmission period T4a for transmitting the fourth read data RD4 from the fourth nonvolatile memory 120d to the buffer memory 112b and a fourth external transmission period T4b for transmitting the fourth read data RD4 from the buffer memory 112b to the host 200.

For example, the length of the second internal transmission period T2a may be greater than the length of the first, third, and fourth internal transmission periods T1a, T3a, and T4a. In other words, the read latency of the second read operation corresponding to the second read request REQ2 may be longer than the read latencies of the first, third, and fourth read operations respectively corresponding to the first, third, and fourth read requests REQ1, REQ3, and REQ4. For example, the buffer memory 112b may first receive the third read data RD3, then receive the first read data RD1, then receive the fourth read data RD4, and then receive the second read data RD2. In this case, like a first response queue RQ1', the first to fourth read data RD1 to RD4 may be buffered in the buffer memory 112b such that the third read data RD3 is first output, then the first read data RD1 is output, then the fourth read data RD4 is output, and then the second read data RD2 is output.

In some implementations, when the second internal transmission period T2a is longer than a reference time, the storage controller 110b may reorder the output sequence of the first to fourth read data RD1 to RD4. Particularly, the storage controller 110b may reorder the output sequence of the first to fourth read data RD1 to RD4 such that the second read data RD2 is first output, then the third read data RD3 is output, then the first read data RD1 is output, and then the fourth read data RD1 is output, and accordingly, the first to fourth read data RD1 to RD4 are buffered in the buffer memory 112b like a second response queue RQ2'.

The storage controller 110b may sequentially transmit the second read data RD2, the third read data RD3, the first read data RD1, and the fourth read data RD4 to the host 200 according to the reordered output sequence. For example, the storage controller 110b may sequentially transmit second, third, first, and fourth responses RSP2, RSP3, RSP1, and RSP4 to the host 200 through a transmission channel CH_T. Particularly, the storage controller 110b may first transmit the second response RSP2 including the second read data RD2 to the host 200, then transmit the third response RSP3 including the third read data RD3 to the host 200, then transmit the first response RSP1 including the first read data to the host 200, and then transmit the fourth response RSP4 including the fourth read data RD4 to the host 200.

FIG. 12 illustrates examples of read latency for each state of a nonvolatile memory NVM according to some implementations. In FIGS. 11 and 12, when the nonvolatile memory NVM is in an idle state, the nonvolatile memory NVM may immediately perform a read operation in response to a read command. In this case, the length of the internal transmission period of the read operation may be relatively short. For example, the fourth nonvolatile memory 120d of FIG. 11 may be in an idle state and accordingly may immediately perform a fourth read operation corresponding to the fourth read command CMD4. In this case, the fourth internal transmission period T4a may be shorter than the first to third internal transmission periods T1a to T3a.

When the nonvolatile memory NVM is processing a previous read operation, the nonvolatile memory NVM may not immediately perform a read operation in response to a read command. In this case, the nonvolatile memory NVM may perform the read operation after completing the previous read operation. For example, the third nonvolatile memory 120c of FIG. 13 may perform a third read operation corresponding to the third read command CMD3 after completing the previous read operation. In this case, the third internal transmission period T3a may be longer than the fourth internal transmission period T4a.

When the nonvolatile memory NVM is processing a previous program operation, the nonvolatile memory NVM may not immediately perform a read operation in response to a read command. In this case, the nonvolatile memory NVM may perform the read operation after completing the previous program operation. For example, the first nonvolatile memory 120a of FIG. 13 may perform a first read operation corresponding to the first read command CMD1 after completing the previous program operation. In this case, because the time required for the program operation is longer than the time required for the read operation, the first internal transmission period T1a may be longer than the fourth internal transmission period T4a.

When the nonvolatile memory NVM is processing a previous erase operation, the nonvolatile memory NVM may not immediately perform a read operation in response to a read command. In this case, the nonvolatile memory NVM may perform the read operation after completing the previous erase operation. For example, the second nonvolatile memory 120b of FIG. 13 may perform a second read operation corresponding to the second read command CMD2 after completing the previous erase operation. In this case, because the time required for the erase operation is longer than the time required for the program operation, the second internal transmission period T2a may be longer than the first internal transmission period T1a.

As such, the execution time of the read operation performed in the nonvolatile memory NVM may be modified according to the operation state of the nonvolatile memory NVM, and the length of the internal transmission period in which read data is transmitted from the nonvolatile memory NVM to the buffer memory may be modified. According to some implementations, an output priority may be given to read data corresponding to a read operation with a relatively longer execution time, and the prioritized read data may be transmitted to the host before other read data. Accordingly, the overall read latency of the storage system may be improved, and consequently, the performance of the storage system may be improved.

Figure 13:
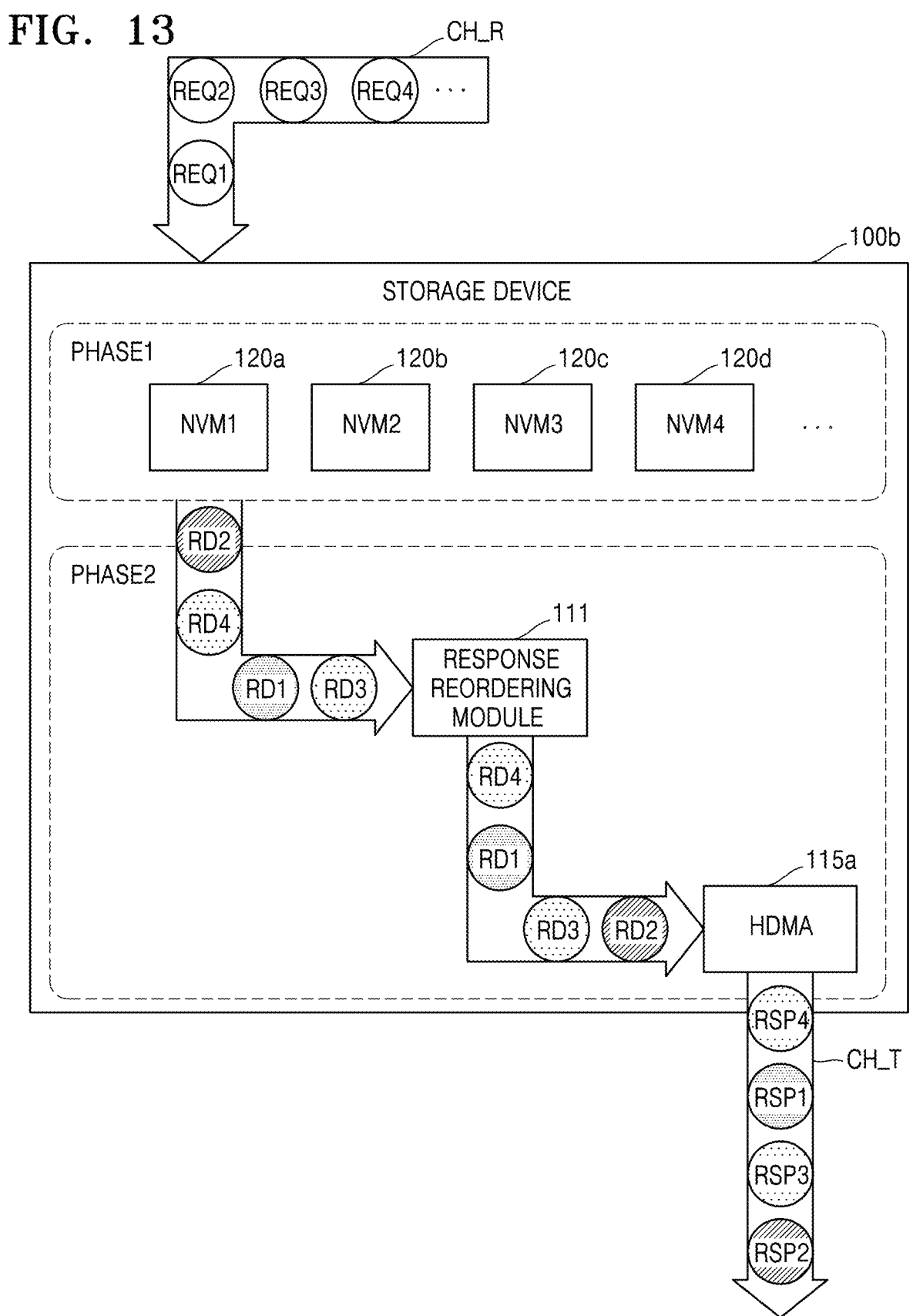
FIG. 13 is a block diagram illustrating an example of an operation of a storage device according to some implementations.

FIG. 13 is a block diagram illustrating an example of an operation of a storage device according to some implementations. In FIG. 13, an operation of the storage device 100b represents in more detail the operation of the storage controller 110b illustrated in FIG. 10. The storage device 100b may sequentially receive the first to fourth read requests REQ1 to REQ4 through the reception channel CH_R. In the internal transmission period PHASE1, the first to fourth nonvolatile memories 120a to 120d may perform the first to fourth read operations respectively corresponding to the first to fourth read requests REQ1 to REQ4. For example, when the first nonvolatile memory 120a immediately performs the first read operation and the second nonvolatile memory 120b fails to immediately perform the second read operation due to the processing of a previous operation, the length of the second internal transmission period T2a of the second read operation may be greater than the length of the first internal transmission period T1a of the first read operation.

In the external transmission period PHASE2, in order to compensate for the read latency of the second read request REQ2 due to the length of the second internal transmission period T2a, the response reordering module 111 may reorder the output sequence of the first to fourth read data RD1 to RD4 such that the second read data RD2 is output before the first, third, and fourth read data RD1, RD3, and RD4. Particularly, the storage controller 110b may first output the second response RSP2 including the second read data RD2 and then output the third response RSP3 including the third read data RD3 and then output the first response RSP1 including the first read data and then output the fourth response RSP4 including the fourth read data RD4. For example, an HDMA 115a may first output the second response RSP2 and then output the third, first, and fourth responses RSP3, RSP1, and RSP4 through the transmission channel CH_T. For example, the HDMA 115a may correspond to an example of the host interface 115.

Figure 14:
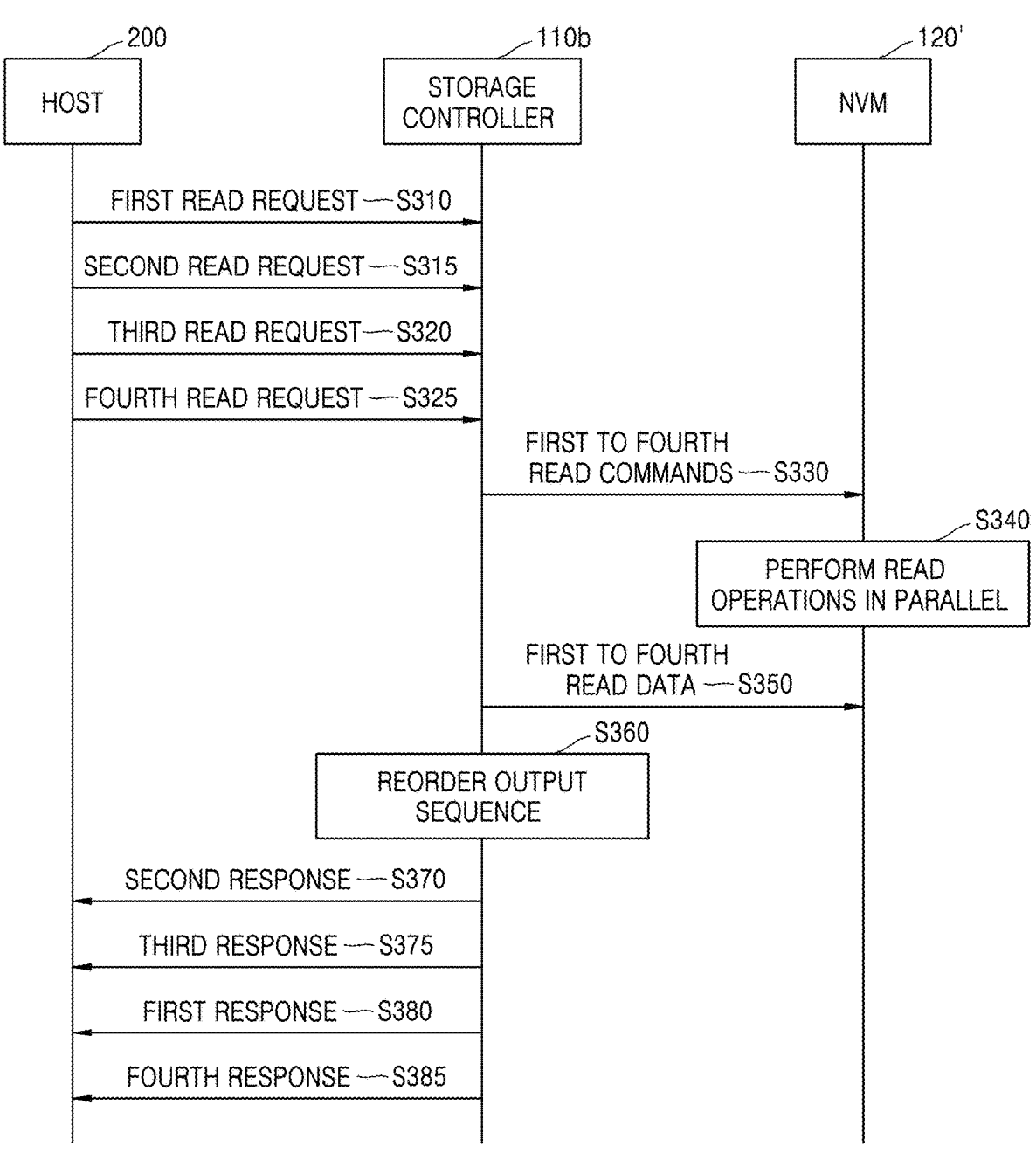
FIG. 14 is a flowchart illustrating examples of an operating method of a host, a storage controller, and a nonvolatile memory device according to some implementations.

FIG. 14 is a flowchart illustrating examples of an operating method of a host, a storage controller, and a nonvolatile memory device according to some implementations. In FIG. 14, an operating method may be performed, for example, by the host 200, the storage controller 110b, and the nonvolatile memory device 120' of FIG. 10. In operation S310, the host 200 may transmit a first read request REQ1 to the storage controller 110*b*. In operation S315, the host 200 may transmit a second read request REQ2 to the storage controller 110*b*. In operation S320, the host 200 may transmit a third read request REQ3 to the storage controller 110*b*. In operation S325, the host 200 may transmit a fourth read request REQ4 to the storage controller 110*b*. As such, the host 200 may sequentially transmit the first to fourth read requests REQ1 to REQ4 to the storage controller 110*b*.

In operation S330, the storage controller 110*b* may transmit first to fourth read commands CMD1 to CMD4 respectively corresponding to the first to fourth read requests REQ1 to REQ4 to the nonvolatile memory device 120'. In operation S340, the nonvolatile memory device 120' may perform first to fourth read operations in response to the first to fourth read commands CMD1 to CMD4. For example, the nonvolatile memory device 120' may perform the first to fourth read operations in parallel. In operation S350, the nonvolatile memory device 120' may transmit first to fourth read data RD1 to RD4 to the storage controller 110*b*.

In operation S360, the storage controller 110*b* may reorder the output sequence of the first to fourth read data RD1 to RD4. For example, the storage controller 110*b* may reorder the output sequence such that the second read data RD2 is output before the first, third, and fourth read data RD1, RD3, and RD4. In an embodiment, the storage controller 110*b* may reorder the output sequence of the first to fourth read data RD1 to RD4 based on the execution times of the first to fourth read operations. In some implementations, the storage controller 110*b* may reorder the output sequence of the first to fourth read data RD1 to RD4 based on the first internal transmission period (e.g., T1*a* of FIG. 11) of the first read operation, the second internal transmission period (e.g., T2*a* of FIG. 11) of the second read operation, the third internal transmission period (e.g., T3*a* of FIG. 11) of the third read operation, and the fourth internal transmission period (e.g., T4*a* of FIG. 11) of the fourth read operation. In some implementations, the storage controller 110*b* may determine the pending time during which the second read data RD2 is pending in the buffer memory to be shorter than the pending times during which the first, third, and fourth read data RD1, RD3, and RD3 are pending in the buffer memory.

In operation S370, the storage controller 110*b* may transmit a second response RSP2 including the second read data RD2 to the host 200. In operation S375, the storage controller 110*b* may transmit a third response RSP3 including the third read data RD3 to the host 200. In operation S380, the storage controller 110*b* may transmit a first response RSP1 including the first read data RD1 to the host 200. In operation S385, the storage controller 110*b* may transmit a fourth response RSP4 including the fourth read data RD4 to the host 200. As such, the storage controller 110*b* may sequentially transmit the second, third, first, and fourth responses RSP2, RSP3, RSP1, and RSP4 to the host 200.

Figure 15:
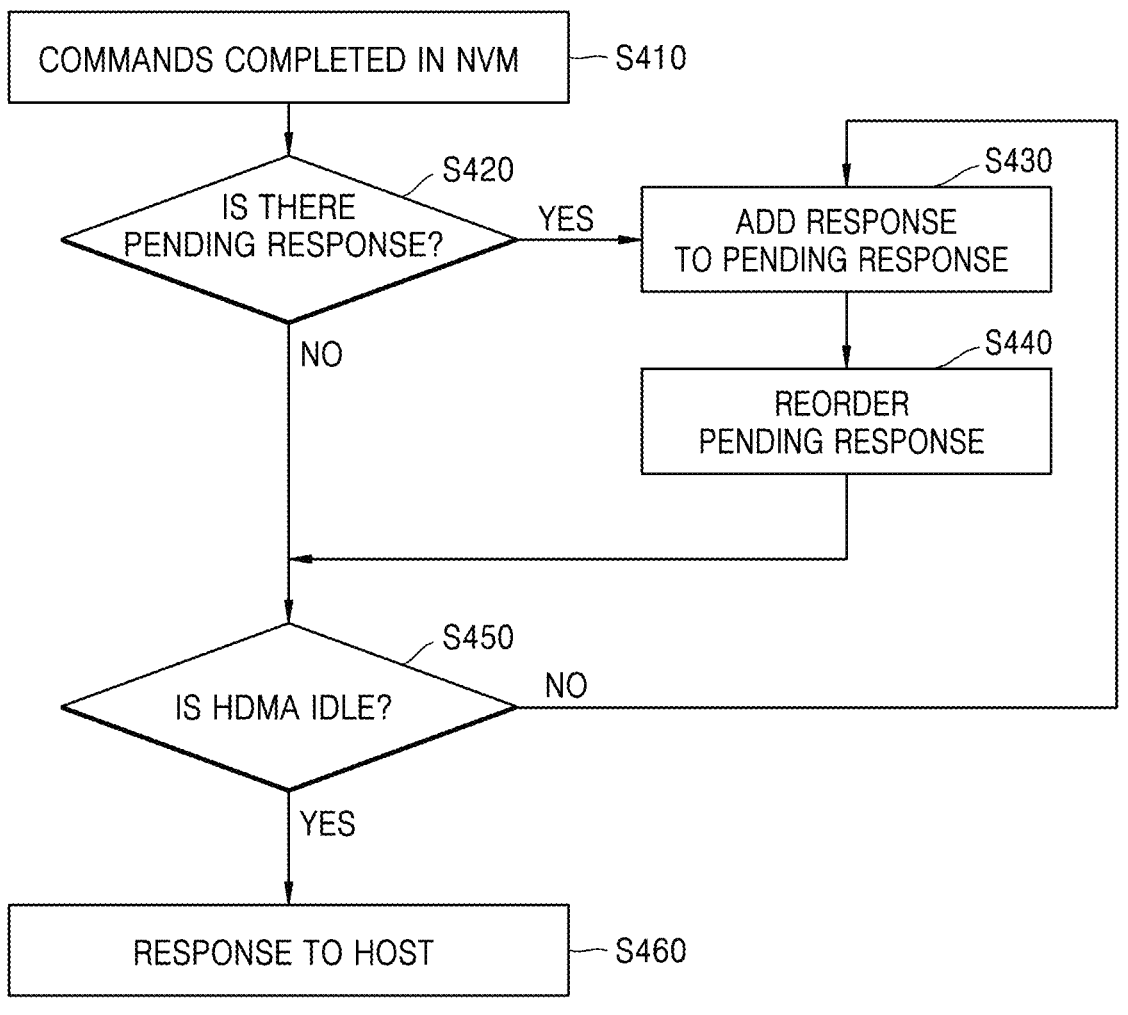
FIG. 15 is a flowchart illustrating an example of a response reordering operation method of a storage device according to some implementations.

FIG. 15 is a flowchart illustrating an example of a response reordering operation method of a storage device according to some implementations. In FIG. 15, an operating method of the storage device according to some implementations may include, for example, operations performed in a time series in the storage device 100 of FIG. 1. The descriptions given above with reference to FIGS. 1 to 14 may also be applied to some implementations. In operation S410, memory operations corresponding to a plurality of commands may be completed in a nonvolatile memory. For example, the memory operation may be a read operation, and as a result of performing the memory operations, a plurality of pieces of read data may be transmitted from the nonvolatile memory to a buffer memory. Hereinafter, read data transmitted from the nonvolatile memory to the buffer memory will be referred to as current read data, and a response including the current read data will be referred to as a current response.

In operation S420, the storage controller 110 may determine whether there is a pending response in the buffer memory. When there is a pending response in the buffer memory, the storage controller 110 may add a current response to the pending response, in operation S430. For example, the storage controller 110 may add the current read data received from the nonvolatile memory device 120 to the response queue (e.g., RQ1 of FIG. 5 or RQ1' of FIG. 10) of the buffer memory. In operation S440, the storage controller 110 may reorder the pending responses. In operation S450, the storage controller 110 may determine whether the transmission channel CH_T connected to the host 200, for example, HDMA, is in an idle state. When the HDMA is in an idle state as a result of the determination, the storage controller 110 may transmit a response to the host 200, in operation S460. On the other hand, when the HDMA is not in an idle state as a result of the determination, operation S430 may be performed.

As such, according to some implementations, when the HDMA is in an idle state as a result of monitoring the HDMA, the storage device 100 may immediately transmit, to the host 200, a response RSP corresponding to the request REQ from the host 200 in order to ensure the maximum throughput. On the other hand, when the HDMA is in a busy state as a result of monitoring the HDMA, the storage device 100 may perform reordering on the responses pending in the buffer memory. Accordingly, by efficiently using the transmission resources, the read latency may be optimized and the throughput of the storage device 100 may be improved.

Figure 16:
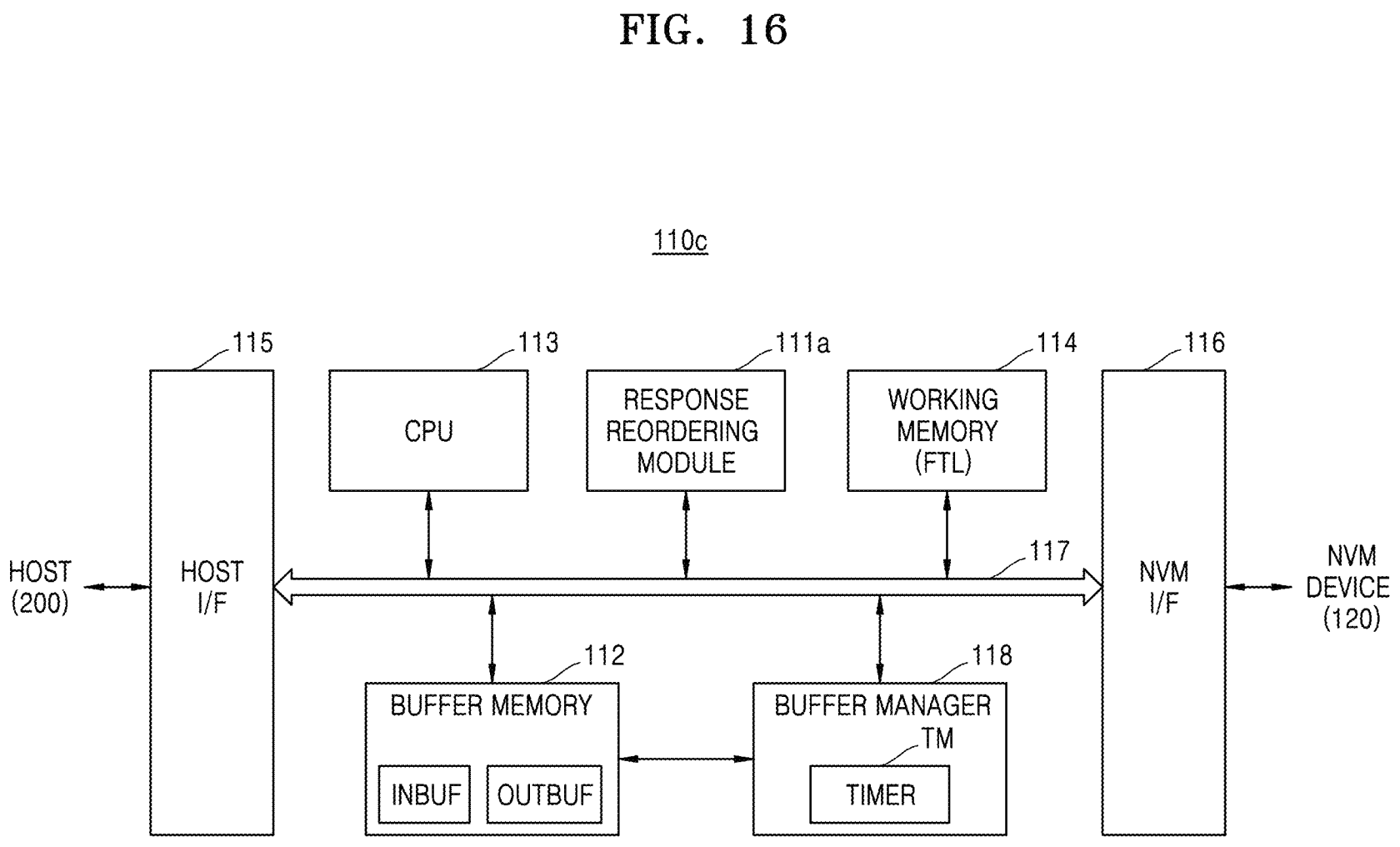

FIG. 16 is a block diagram illustrating an example of a storage controller according to some implementations. In FIG. 16, a storage controller 110*c* may correspond to an implementation of the storage controller 110 of FIG. 4. The storage controller 110*c* may further include a buffer manager 118 compared to the storage controller 110 of FIG. 4. The buffer manager 118 may be connected to a buffer memory 112 to manage the buffer memory 112. For example, the buffer manager 118 may include a timer TM. Hereinafter, an operation of the storage controller 110*c* will be described with reference to FIGS. 5 and 10.

The buffer memory 112 may include an input buffer INBUF and an output buffer OUTBUF. The input buffer INBUF may buffer a request and/or write data received from the host 200. For example, the input buffer INBUF may correspond to a request queue, a command queue, or a write data queue. The output buffer OUTBUF may buffer read data received from the nonvolatile memory device 120. For example, the output buffer OUTBUF may correspond to a read data queue or a response queue (e.g., RQ1 or RQ2 of FIG. 5, or RQ1' or RQ2' of FIG. 10).

The timer TM may record a response reception time at which read data is received in the output buffer OUTBUF, a response pending time during which read data and/or a response are/is pending in the output buffer OUTBUF, and/or the like. A response reordering module 111*a* may reorder the read data or responses buffered in the output buffer OUTBUF based on the response reception time and/or the response pending time recorded in the timer TM. For example, the response reordering module 111*a* may reorder the read data or responses queued in the first response queue RQ1 or RQ1' like the second response queue RQ2 or RQ2'.

Also, the timer TM may record a request reception time at which a request and/or write data arc/is received in the input buffer INBUF, a request pending time during which a request and/or write data are/is pending in the input buffer INBUF, and/or the like. The storage controller 110c may reorder the request or write data buffered in the input buffer INBUF based on the request reception time and/or the request pending time recorded in the timer TM. Accordingly, the storage controller 110c may transmit data from the buffer memory 112 to the nonvolatile memory device 120 according to the reordered sequence.

Figure 17:
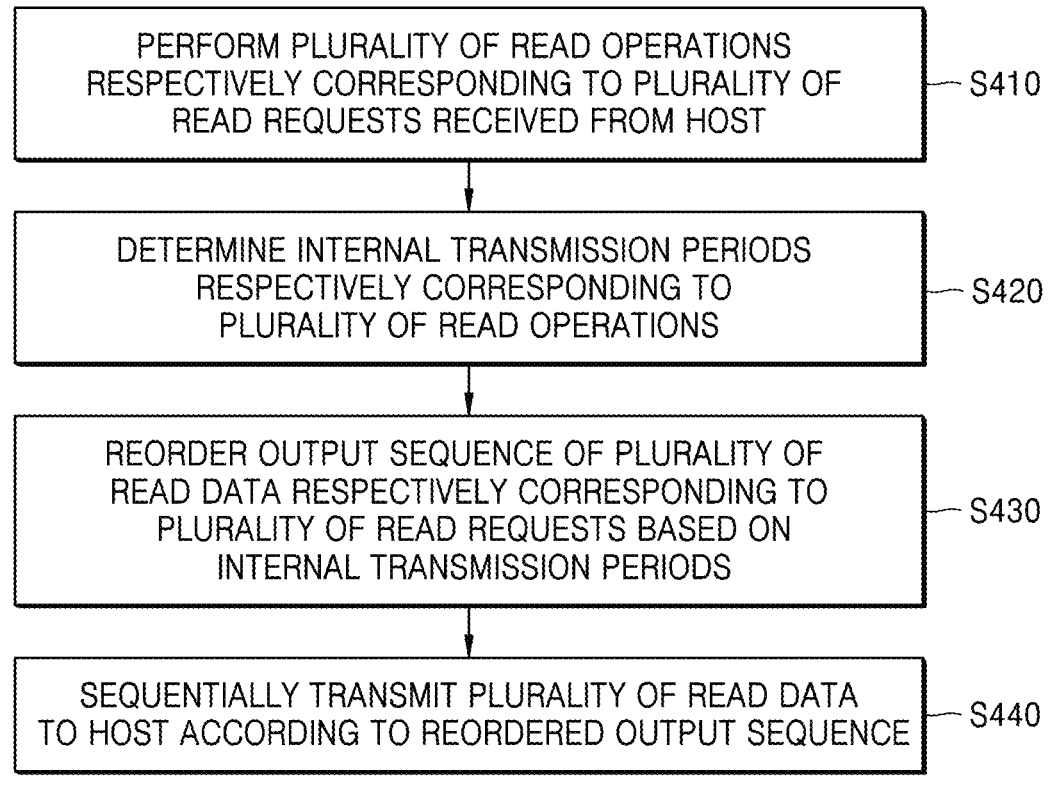
FIG. 17 is a flowchart illustrating an example of an operating method of a storage device according to some implementations.

FIG. 17 is a block diagram illustrating an example of an operating method of a storage controller according to some implementations. In FIG. 17, an operating method of the storage controller may include, for example, operations performed in a time series in the storage controller 110 of FIG. 1. The descriptions given above with reference to FIGS. 1 to 16 may also be applied to some implementations. In operation S410, the storage controller 110 may perform a plurality of read operations respectively corresponding to a plurality of read requests received from the host 200. In operation S420, the storage controller 110 may determine internal transmission periods respectively corresponding to the plurality of read operations. In operation S430, the storage controller 110 may reorder the output sequence of a plurality of pieces of read data respectively corresponding to the plurality of read requests based on the internal transmission periods. In operation S440, the storage controller 110 may sequentially transmit the plurality of pieces of road data to the host 200 according to the reordered output sequence.

Figure 18:
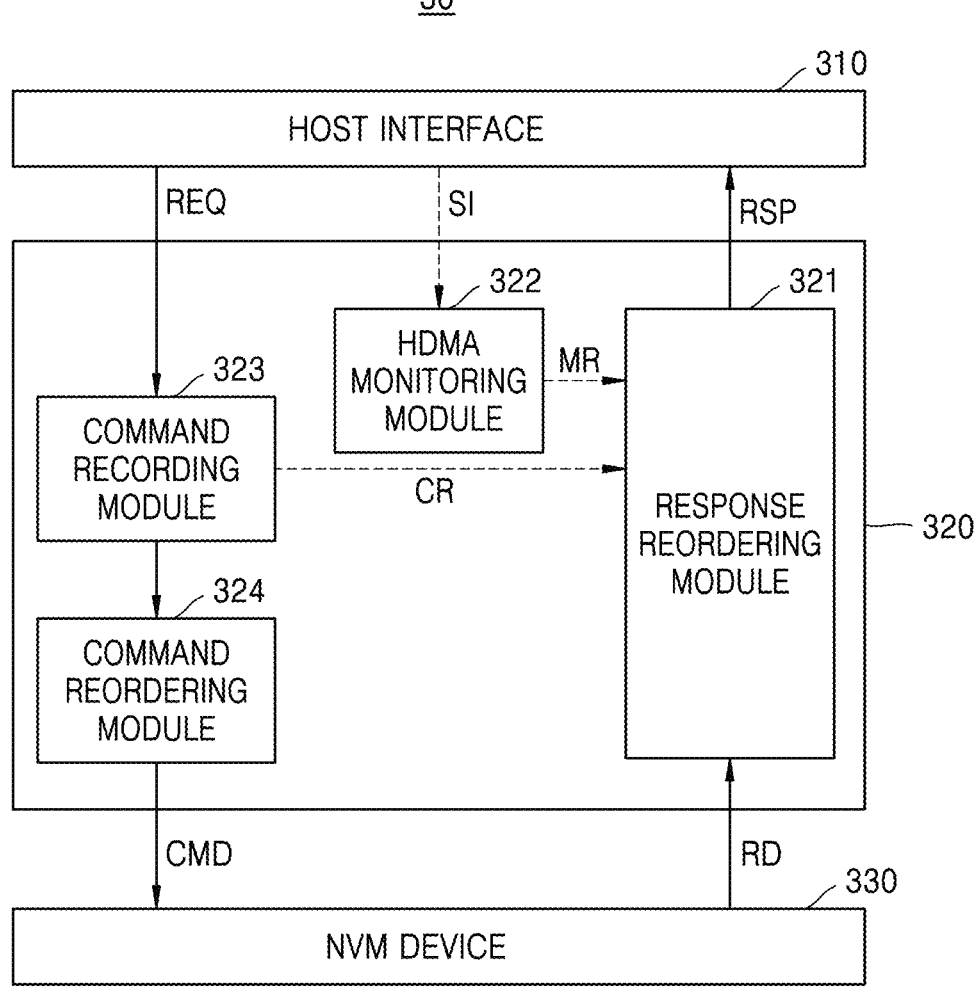
FIG. 18 is a block diagram illustrating an example of a storage device according to some implementations.

FIG. 18 is a block diagram illustrating an example of a storage device according to some implementations. In FIG. 18, a storage device 30 may include a host interface 310, a controller 320, and a nonvolatile memory device 330. The controller 320 according to some implementations may correspond to an implementation of the storage controller 110. For example, the host interface 310 and the controller 320 may be included in the storage controller 110 of FIG. 1. Also, the storage device 30 may further include a buffer memory, and in this case, the host interface 310, the controller 320, and the buffer memory may be included in the storage controller 110 of FIG. 1.

The host interface 310 may sequentially receive a plurality of requests from a host and sequentially transmit a plurality of responses respectively corresponding to the plurality of requests to the host. For example, the host interface 310 may receive a plurality of requests and/or write data from the host through a reception channel (e.g., CH_R of FIG. 5), and in this case, the reception channel may include Host-to-DRAM (H2D), for example, PCI-to-Buffer. For example, the host interface 310 may transmit a plurality of responses and/or read data to the host through a transmission channel (e.g., CH_T of FIG. 5), and in this case, the transmission channel may include DRAM-to-Host (D2H), for example, Buffer-to-PCI.

The controller 320 may include a response reordering module 321, an HDMA monitoring module 322, a command recording module 323, and a command reordering module 324. The command recording module 323 may record the reception sequence of requests REQ or commands received through the host interface 310. The command recording module 323 may generate information CR about the reception sequence of requests REQ or commands and provide the generated information CR to the response reordering module 321.

The command reordering module 324 may reorder the sequence of commands to be transmitted to the nonvolatile memory device 330. Particularly, the command reordering module 324 may receive commands from the command recording module 323 and reorder the sequence of the received commands. For example, when the nonvolatile memory device 330 includes a plurality of nonvolatile memories such as a plurality of nonvolatile memory dies or a plurality of nonvolatile memory planes and interleaving on the plurality of nonvolatile memories is possible, the command reordering module 324 may reorder the sequence of the commands.

The HDMA monitoring module 322 may monitor the state of the host interface 310 and provide a monitoring result MR to the response reordering module 321. Particularly, the HDMA monitoring module 322 may determine whether the HDMA is in a busy state or in an idle state. For example, the HDMA monitoring module 322 may determine whether a transmission channel, for example, D2H, is in a busy state or in an idle state.

In some implementations, the HDMA monitoring module 322 may provide the response reordering module 321 with a control signal that is enabled when the HDMA is in an idle state, and the response reordering module 321 may provide a response RSP to the host interface 310 in response to the control signal. In some implementations, the HDMA monitoring module 322 may provide the response reordering module 321 with a control signal that is enabled when the HDMA is in a busy state, and the response reordering module 321 may pend a response RSP in the buffer memory in response to the control signal.

When the HDMA is in an idle state as a result of the monitoring, the storage device 30 may immediately transmit, to the host, a response RSP corresponding to the request REQ from the host in order to ensure the maximum throughput. On the other hand, when the HDMA is in a busy state as a result of the monitoring, the response reordering module 321 may perform reordering on the pending responses. As such, the response reordering module 321 may optimize the read latency by considering the command reception time, the HDMA state, and the internal operation status of the nonvolatile memory device 330.

FIG. 19 is a flowchart illustrating an example of an operating method of a storage device according to some implementations. In FIG. 19, an operating method of the storage device may be performed, for example, in the storage device 30 of FIG. 18. In operation S510, the storage device 30 may perform a plurality of read operations respectively corresponding to a plurality of read requests received from a host. In operation S520, the storage device 30 may determine internal transmission periods respectively corresponding to the plurality of read operations. In operation S530, the storage device 30 may determine at least one of the read latencies of the plurality of read operations, the reception sequence of the plurality of read requests, and the state of a transmission channel connected to the host. According to some implementations, operations S520 and S530 may be performed in parallel. According to some implementations, operation S530 may be first performed and then operation S520 may be performed.

In operation S540, based on at least one of the read latencies, the reception sequence, and the state of the transmission channel, and the internal transmission periods, the storage device 30 may reorder the output sequence of a plurality of pieces of read data respectively corresponding to the plurality of read requests. In operation S550, the storage device 30 may sequentially transmit the plurality of pieces of read data to the host according to the reordered output sequence.

Figure 20:
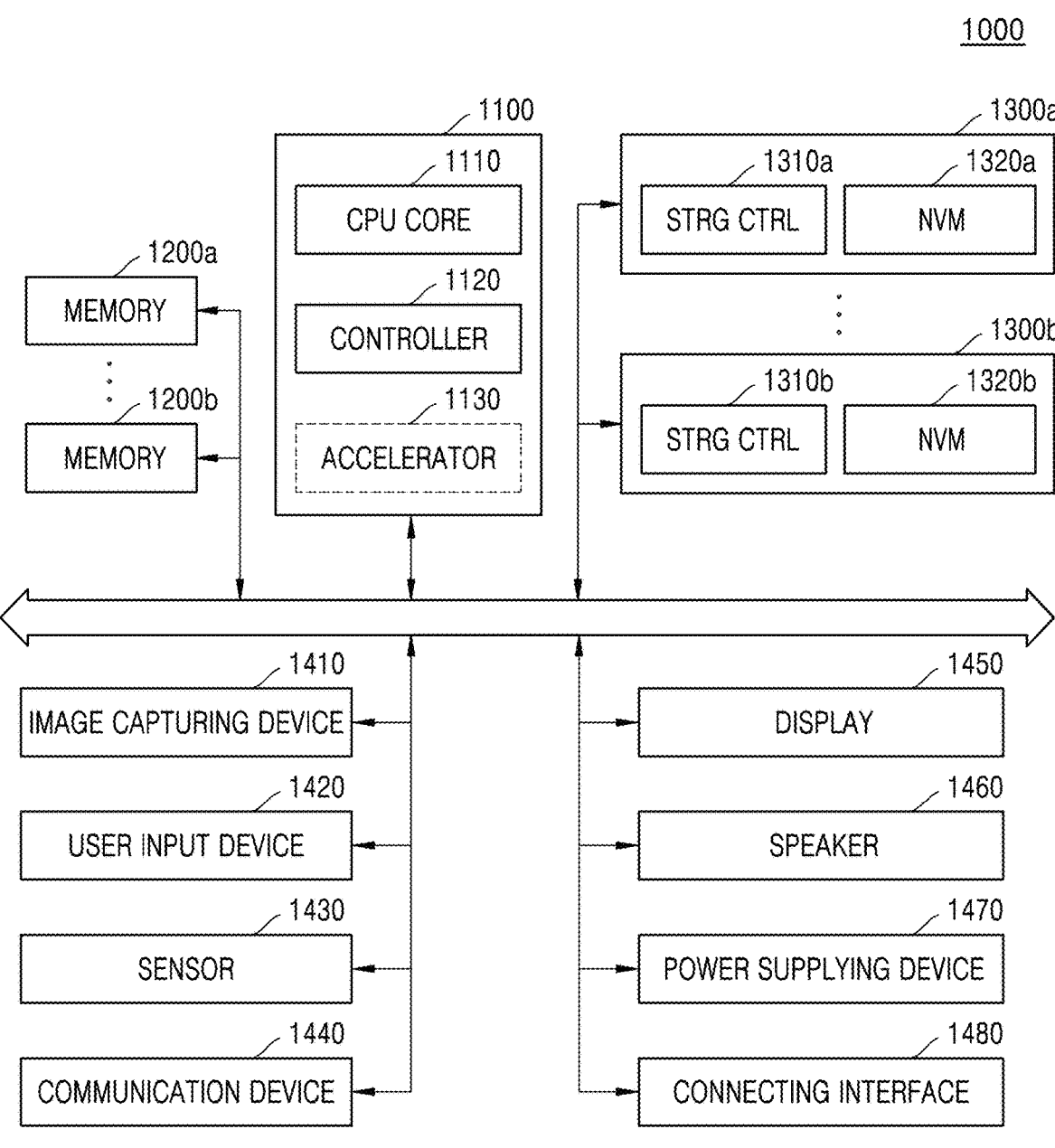
FIG. 20 illustrates an example of a system to which a storage device is applied according to some implementations.

FIG. 20 illustrates an example of a system to which a storage device is applied according to some implementations. In FIG. 20, a system 1000 may be a mobile system, such as a portable communication terminal (mobile phone), a smart phone, a tablet personal computer (PC), a wearable device, a healthcare device, or an Internet of Things (IoT) device. However, the system 1000 of FIG. 20 is not necessarily limited to a mobile system and may also be, for example, a personal computer, a laptop computer, a server, a media player, or an automotive device such as a navigation device. In FIG. 20, the system 1000 may include a main processor 1100, memories 1200a and 1200b, and storage devices 1300a and 1300b and may further include an image capturing device 1410, a user input device 1420, a sensor 1430, a communication device 1440, a display 1450, a speaker 1460, a power supply device 1470, and a connection interface 1480.

The main processor 1100 may control an overall operation of the system 1000, and more particularly, an operation of other components constituting the system 1000. The main processor 1100 may be implemented as, for example, a general-purpose processor, a dedicated processor, or an application processor. The main processor 1100 may include one or more CPU cores 1110 and may further include a controller 1120 for controlling the memories 1200a and 1200b and/or the storage devices 1300a and 1300b. According to some implementations, the main processor 1100 may further include an accelerator 1130 that is a dedicated circuit for high-speed data operation such as artificial intelligence (AI) data operation. The accelerator 1130 may include, for example, a graphics processing unit (GPU), a neural processing unit (NPU), and/or a data processing unit (DPU) and may be implemented as a separate chip that is physically independent from other components of the main processor 1100.

The memories 1200a and 1200b may be used as a main memory device of the system 1000 and may include volatile memories, such as SRAMs and/or DRAMs, or may include nonvolatile memories, such as flash memories, PRAMs, and/or RRAMs. The memories 1200a and 1200b may also be implemented in the same package as the main processor 1100.

The storage devices 1300a and 1300b may function as a nonvolatile storage device that stores data regardless of whether power is supplied thereto, and may have a larger storage capacity than the memories 1200a and 1200b. The storage devices 1300a and 1300b may include storage controllers 1310a and 1310b and nonvolatile memories 1320a and 1320b for storing data under the control by the storage controllers 1310a and 1310b. The nonvolatile memories 1320a and 1320b may include a flash memory having a 2D structure or a 3D vertical NAND (V-NAND) structure or may include other types of nonvolatile memories, such as PRAMs and/or RRAMs.

The storage devices 1300a and 1300b may be included in the system 1000 in a state physically separated from the main processor 1100 or may be implemented in the same package as the main processor 1100. Also, because the storage devices 1300a and 1300b have the same shape as an SSD or a memory card, the storage devices 1300a and 1300b may be coupled to be detachably attached to other components of the system 1000 through an interface such as the connection interface 1480 described below. The storage devices 1300a and 1300b may be devices to which a standard protocol such as UFS, eMMC, or NVMe is applied, but are not necessarily limited thereto. The implementations described above with reference to FIGS. 1 to 19 may be implemented in the storage devices 1300a and 1300b.

The image capturing device 1410 may capture a still image or a moving image and may include, for example, a camera, a camcorder, and/or a webcam. The user input device 1420 may receive various types of data input from the user of the system 1000 and may include, for example, a touch pad, a keypad, a keyboard, a mouse, and/or a microphone. The sensor 1430 may detect various types of physical quantities that may be obtained from the outside of the system 1000, and convert the detected physical quantities into electrical signals. The sensor 1430 may include, for example, a temperature sensor, a pressure sensor, an illuminance sensor, a position sensor, an acceleration sensor, a biosensor, and/or a gyroscope sensor.

The communication device 1440 may transmit/receive signals to/from other devices outside the system 1000 according to various communication protocols. The communication device 1440 may be implemented including, for example, an antenna, a transceiver, and/or a modem. The display 1450 and the speaker 1460 may function as output devices that respectively output visual information and aural information to the user of the system 1000. The power supply device 1470 may suitably convert power supplied from a battery (not illustrated) built in the system 1000 and/or an external power supply and supply the power to each of the components of the system 1000. The connection interface 1480 may provide a connection between the system 1000 and an external device that may be connected to the system 1000 to exchange data with the system 1000.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

What is claimed is:

1. A storage device comprising:
    a storage controller configured to control, in response to a plurality of read requests sequentially received from a host, a plurality of read operations respectively corresponding to the plurality of read requests;
    a plurality of nonvolatile memories connected to the storage controller through a plurality of channels and configured to perform the plurality of read operations in parallel; and
    a buffer memory connected to the plurality of nonvolatile memories,
    wherein each read operation of the plurality of read operations includes a respective internal transmission period for transmitting read data from the plurality of nonvolatile memories to the buffer memory and a respective external transmission period for transmitting the read data from the buffer memory to the host, and
    wherein the storage controller is configured to:

reorder, based on the internal transmission periods of the plurality of read operations, an output sequence of a plurality of pieces of read data respectively corresponding to the plurality of read requests such that read data corresponding to a read operation with a longest internal transmission period among the plurality of read operations is arranged to be output first, and sequentially transmit the plurality of pieces of read data to the host according to the reordered output sequence.

2. The storage device of claim 1, wherein the respective internal transmission period of each read operation includes:
a respective first period for transmitting the read data from a memory cell array to a page buffer circuit in a corresponding nonvolatile memory among the plurality of nonvolatile memories; and
a respective second period for transmitting the read data from the page buffer circuit to the buffer memory.

3. The storage device of claim 1, wherein the respective external transmission period includes a pending period in which the read data is pending in the buffer memory.

4. The storage device of claim 3, wherein the storage controller is configured to reorder the output sequence of the plurality of pieces of read data such that a pending period of read data corresponding to a read operation with the longest internal transmission period among the plurality of read operations is shorter than pending periods of other read data.

5. The storage device of claim 1, further comprising a host interface configured to sequentially receive the plurality of read requests from the host and sequentially transmit the plurality of pieces of read data to the host according to the reordered output sequence.

6. The storage device of claim 5,
wherein the host interface is configured to receive a first read request among the plurality of read requests and then receive a second read request among the plurality of read requests,
wherein the plurality of nonvolatile memories are configured to perform in parallel a first read operation of reading first read data according to the first read request and a second read operation of reading second read data according to the second read request, and
wherein the storage controller is configured to reorder, when a second internal transmission period of the second read operation is longer than a first internal transmission period of the first read operation, the output sequence such that the second read data is first output and then the first read data is output.

7. The storage device of claim 6,
wherein a first nonvolatile memory of the plurality of nonvolatile memories configured to perform the first read operation is configured to be in an idle state before the first read operation, and
wherein a second nonvolatile memory of the plurality of nonvolatile memories configured to perform the second read operation is configured to perform a program operation, an erase operation, or other read operations before the second read operation.

8. The storage device of claim 6, wherein the storage controller is configured to reorder the output sequence such that a first transmission time during which the first read data is transmitted from the buffer memory to the host is longer than a second transmission time during which the second read data is transmitted from the buffer memory to the host.

9. The storage device of claim 1, wherein the storage controller comprises a response reordering module configured to reorder the output sequence based on at least one of read latencies of the plurality of read requests, a reception order in which the plurality of read requests are received from the host, and a state of a transmission channel connected to the host, and the respective internal transmission periods.

10. The storage device of claim 9, wherein the storage controller further comprises a command recording module configured to record the reception order in which the plurality of read requests are received from the host.

11. The storage device of claim 10, wherein the storage controller further comprises a command reordering module configured to reorder, according to the reception order, a transmission order in which a plurality of read commands corresponding to the plurality of read requests are transmitted to the plurality of nonvolatile memories.

12. The storage device of claim 9, wherein the storage controller further comprises a monitoring module configured to monitor the state of the transmission channel connected to the host.

13. The storage device of claim 12, wherein the response reordering module is configured to:
sequentially transmit the plurality of pieces of read data to the host when the transmission channel is in an idle state as a result of the monitoring; and
reorder the output sequence of the plurality of pieces of read data when the transmission channel is in a busy state as a result of the monitoring.

14. A storage controller for controlling a plurality of nonvolatile memories, the storage controller comprising:
a host interface configured to sequentially receive a plurality of read requests from a host;
a response reordering module configured to reorder, based on execution times of a plurality of read operations executed in the plurality of nonvolatile memories in response respectively to the plurality of read requests, an output sequence of a plurality of pieces of read data respectively corresponding to the plurality of read requests such that read data corresponding to a read operation with an execution time longer than a reference time is first output; and
a nonvolatile memory interface configured to transmit a plurality of read commands respectively corresponding to the plurality of read requests to the plurality of nonvolatile memories in parallel through a plurality of channels,
wherein the host interface is configured to sequentially transmit the plurality of pieces of read data to the host according to the reordered output sequence.

15. The storage controller of claim 14, further comprising a buffer memory connected to the plurality of nonvolatile memories,
wherein each of the plurality of read operations includes an internal transmission period for transmitting read data from the plurality of nonvolatile memories to the buffer memory and an external transmission period for transmitting the read data from the buffer memory to the host, and
wherein the response reordering module is configured to reorder the output sequence of the plurality of pieces of read data based on the internal transmission periods respectively corresponding to the plurality of read operations.

16. The storage controller of claim 15, wherein the response reordering module is configured to reorder the output sequence of the plurality of pieces of read data such that read data corresponding to a read operation with a longest internal transmission period among the plurality of read operations is first output.

17. The storage controller of claim 15, wherein the external transmission period includes a pending period in which the read data is pending in the buffer memory.

18. The storage controller of claim 17, wherein the response reordering module is configured to reorder the output sequence of the plurality of pieces of read data such that a pending period of read data corresponding to a read operation with a longest internal transmission period among the plurality of read operations is shorter than pending periods of other read data.

19. An operating method of a storage controller, the operating method comprising:

sequentially receiving a plurality of read requests from a host;

transmitting a plurality of read commands respectively corresponding to the plurality of read requests to a plurality of nonvolatile memories;

transmitting a plurality of pieces of read data from the plurality of nonvolatile memories to a buffer memory;

reordering, based on execution times of a plurality of read operations executed in the plurality of nonvolatile memories in response respectively to the plurality of read requests, an output sequence of the plurality of pieces of read data such that read data corresponding to a read operation with an execution time longer than a reference time is first output; and sequentially transmitting the plurality of pieces of read data to the host according to the reordered output sequence.

\* \* \* \* \*